(12) United States Patent
Padmanabhan et al.

(10) Patent No.: US 11,995,647 B2
(45) Date of Patent: May 28, 2024

(54) SYSTEM AND METHOD OF PROVIDING INTEROPERABLE DISTRIBUTED AND DECENTRALIZED LEDGERS USING CONSENSUS ON CONSENSUS AND DELEGATED CONSENSUS

(71) Applicant: Salesforce, Inc., San Francisco, CA (US)

(72) Inventors: Prithvi Krishnan Padmanabhan, San Ramon, CA (US); Marc Benioff, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 280 days.

(21) Appl. No.: 16/399,686

(22) Filed: Apr. 30, 2019

(65) Prior Publication Data
US 2020/0349564 A1    Nov. 5, 2020

(51) Int. Cl.
| G06Q 20/38 | (2012.01) |
| G06F 16/182 | (2019.01) |
| H04L 9/14 | (2006.01) |
| H04L 9/00 | (2022.01) |

(52) U.S. Cl.
CPC ..... *G06Q 20/3829* (2013.01); *G06F 16/1824* (2019.01); *G06F 16/1834* (2019.01); *H04L 9/14* (2013.01); *H04L 9/50* (2022.05)

(58) Field of Classification Search
CPC ........... G06Q 20/3829; G06Q 20/38; G06F 16/1824; G06F 16/1834; G06F 16/2365; G06F 16/18; H04L 9/14; H04L 2209/38; H04L 63/105; H04L 63/0823; H04L 63/123; H04L 9/3239; H04L 9/50;
(Continued)

(56) References Cited

U.S. PATENT DOCUMENTS

| 5,634,053 A | 5/1997 | Noble et al. |
| 6,333,929 B1 | 12/2001 | Drottar et al. |
| 7,587,348 B2 | 9/2009 | Liao et al. |

(Continued)

FOREIGN PATENT DOCUMENTS

| CN | 108021986 A | 5/2018 |
| CN | 109034809 A | 12/2018 |

(Continued)

OTHER PUBLICATIONS

Kan Luo, A Multiple Blockchains Architecture on Inter-Blockchain communication, IEEE (Year: 2018).*

(Continued)

*Primary Examiner* — El Mehdi Oussir
*Assistant Examiner* — Chunling Ding
(74) *Attorney, Agent, or Firm* — Nicholson, De Vos, Webster & Elliott, LLP

(57) ABSTRACT

A method to enable interoperability between blockchain networks. The method including receiving, by a mapper of an interoperability network, a transaction emitted by a first blockchain network, transforming the received transaction to a transaction compatible with a second blockchain network according to a mapping determined for the received transaction, and forwarding the transformed transaction to the second blockchain network to be processed by the second blockchain network.

12 Claims, 12 Drawing Sheets

(58) Field of Classification Search
CPC ......... H04L 63/08; H04L 63/10; H04L 63/12; H04L 9/32
See application file for complete search history.

(56) References Cited

U.S. PATENT DOCUMENTS

| | | | |
|---|---|---|---|
| 7,730,478 B2 | 6/2010 | Weissman |
| 8,095,463 B1 | 1/2012 | Hartmaier |
| 9,027,094 B1 | 5/2015 | Balazs et al. |
| 9,390,154 B1 | 7/2016 | Baird, III |
| 9,529,923 B1 | 12/2016 | Baird, III |
| 9,569,700 B1 | 2/2017 | Santos et al. |
| 9,646,029 B1 | 5/2017 | Baird, III |
| 9,690,822 B2 | 6/2017 | Roy-Faderman |
| 9,875,510 B1 | 1/2018 | Kasper |
| 9,978,067 B1 | 5/2018 | Sadaghiani et al. |
| 9,998,286 B1 | 6/2018 | Ramathal |
| 10,042,636 B1 | 8/2018 | Srivastava et al. |
| 10,102,265 B1 | 10/2018 | Madisetti |
| 10,210,527 B2 | 2/2019 | Radocchia |
| 10,311,230 B2 | 6/2019 | Jagadeesan et al. |
| 10,373,129 B1 | 8/2019 | James et al. |
| 10,425,399 B2 | 9/2019 | Kravitz et al. |
| 10,482,466 B1 | 11/2019 | Walters et al. |
| 10,491,375 B2 | 11/2019 | Maggu |
| 10,505,726 B1 | 12/2019 | Andon et al. |
| 10,521,196 B1 | 12/2019 | Wang et al. |
| 10,521,780 B1 | 12/2019 | Hopkins et al. |
| 10,528,551 B2 | 1/2020 | Li |
| 10,541,821 B2 | 1/2020 | Toll et al. |
| 10,585,657 B2 | 3/2020 | Padmanabhan |
| 10,628,578 B2 | 4/2020 | Eksten |
| 10,701,054 B2 | 6/2020 | Padmanabhan et al. |
| 10,728,283 B1 | 7/2020 | Dobrek et al. |
| 10,762,079 B2 | 9/2020 | Shi |
| 10,762,506 B1 | 9/2020 | Cash et al. |
| 10,831,935 B2 | 11/2020 | Vijayasankar |
| 10,885,567 B2 | 1/2021 | Bhattacherjee et al. |
| 10,901,974 B2 | 1/2021 | Padmanabhan |
| 10,929,866 B1 | 2/2021 | Qi et al. |
| 11,038,771 B2 | 6/2021 | Padmanabhan |
| 11,068,389 B2 | 7/2021 | Gao |
| 11,082,226 B2 | 8/2021 | Hildebrand et al. |
| 11,100,091 B2 | 8/2021 | Padmanabhan et al. |
| 11,184,394 B1 | 11/2021 | Dobrek et al. |
| 11,244,313 B2 | 2/2022 | Padmanabhan et al. |
| 11,257,073 B2 | 2/2022 | Padmanabhan |
| 11,288,280 B2 | 3/2022 | Padmanabhan et al. |
| 11,431,693 B2 | 8/2022 | Padmanabhan |
| 11,431,696 B2 | 8/2022 | Padmanabhan |
| 11,451,406 B2 * | 9/2022 | Chen ................ H04L 9/3066 |
| 11,468,406 B2 | 10/2022 | Padmanabhan |
| 11,488,176 B2 | 11/2022 | Padmanabhan et al. |
| 11,824,970 B2 | 11/2023 | Padmanabhan |
| 2005/0102159 A1 | 5/2005 | Mondshine |
| 2006/0118611 A1 | 6/2006 | Michelsen et al. |
| 2006/0259361 A1 | 11/2006 | Barhydt et al. |
| 2008/0066165 A1 | 3/2008 | Rosenoer |
| 2009/0037949 A1 | 2/2009 | Birch |
| 2009/0119299 A1 | 5/2009 | Rhodes |
| 2011/0276892 A1 | 11/2011 | Fee |
| 2011/0289140 A1 | 11/2011 | Pletter et al. |
| 2013/0041934 A1 | 2/2013 | Annamalaisami et al. |
| 2013/0151515 A1 | 6/2013 | Davis |
| 2013/0226682 A1 | 8/2013 | Grossman |
| 2013/0346173 A1 | 12/2013 | Chandoor |
| 2014/0039990 A1 | 2/2014 | Georgi |
| 2014/0278894 A1 | 9/2014 | Toumayan et al. |
| 2014/0279857 A1 | 9/2014 | Bharadwaj |
| 2015/0026061 A1 | 1/2015 | Siegel et al. |
| 2016/0012465 A1 | 1/2016 | Sharp |
| 2016/0027229 A1 | 1/2016 | Spanos et al. |
| 2016/0042383 A1 | 2/2016 | Joshi et al. |
| 2016/0092872 A1 | 3/2016 | Prakash et al. |
| 2016/0148251 A1 | 5/2016 | Thomas et al. |
| 2016/0337400 A1 | 11/2016 | Gupta |
| 2016/0350860 A1 | 12/2016 | Dintenfass et al. |
| 2016/0358267 A1 | 12/2016 | Arjomand et al. |
| 2016/0364743 A1 | 12/2016 | St. Lawrence et al. |
| 2017/0005804 A1 | 1/2017 | Zinder |
| 2017/0046698 A1 | 2/2017 | Haldenby et al. |
| 2017/0085545 A1 | 3/2017 | Lohe et al. |
| 2017/0103167 A1 | 4/2017 | Shah |
| 2017/0103472 A1 | 4/2017 | Shah |
| 2017/0132625 A1 | 5/2017 | Kennedy |
| 2017/0132630 A1 | 5/2017 | Castinado et al. |
| 2017/0140145 A1 | 5/2017 | Shah |
| 2017/0161833 A1 | 6/2017 | Porth |
| 2017/0200157 A1 | 7/2017 | Bergeon et al. |
| 2017/0206603 A1 | 7/2017 | Al-Masoud |
| 2017/0236094 A1 | 8/2017 | Shah |
| 2017/0236215 A1 | 8/2017 | Eisen et al. |
| 2017/0289111 A1 | 10/2017 | Voell et al. |
| 2017/0295021 A1 | 10/2017 | Aranda et al. |
| 2017/0295023 A1 | 10/2017 | Madhavan et al. |
| 2017/0300627 A1 | 10/2017 | Giordano et al. |
| 2017/0300872 A1 | 10/2017 | Brown et al. |
| 2017/0300876 A1 | 10/2017 | Musiala et al. |
| 2017/0323392 A1 | 11/2017 | Kasper |
| 2017/0337534 A1 | 11/2017 | Goeringer et al. |
| 2017/0344988 A1 | 11/2017 | Cusden et al. |
| 2017/0353309 A1 | 12/2017 | Gray |
| 2017/0364450 A1 | 12/2017 | Struttmann |
| 2017/0364549 A1 | 12/2017 | Abalos |
| 2017/0364698 A1 | 12/2017 | Goldfarb et al. |
| 2017/0364699 A1 | 12/2017 | Goldfarb et al. |
| 2017/0364700 A1 | 12/2017 | Goldfarb et al. |
| 2017/0364701 A1 | 12/2017 | Struttmann |
| 2017/0366353 A1 | 12/2017 | Struttmann |
| 2017/0372300 A1 | 12/2017 | Dunlevy et al. |
| 2018/0005186 A1 | 1/2018 | Hunn |
| 2018/0006831 A1 | 1/2018 | Toll et al. |
| 2018/0019879 A1 | 1/2018 | Kravitz et al. |
| 2018/0026505 A1 | 1/2018 | Galmiche et al. |
| 2018/0039667 A1 | 2/2018 | Pierce |
| 2018/0041345 A1 | 2/2018 | Maim |
| 2018/0060496 A1 | 3/2018 | Bulleit |
| 2018/0082256 A1 | 3/2018 | Tummuru et al. |
| 2018/0088928 A1 | 3/2018 | Smith et al. |
| 2018/0113752 A1* | 4/2018 | Derbakova ........... H04L 9/3239 |
| 2018/0117446 A1 | 5/2018 | Tran |
| 2018/0117447 A1 | 5/2018 | Tran |
| 2018/0123779 A1 | 5/2018 | Zhang |
| 2018/0139186 A1 | 5/2018 | Castagna |
| 2018/0144042 A1 | 5/2018 | Sheng et al. |
| 2018/0158162 A1 | 6/2018 | Ramasamy |
| 2018/0165416 A1 | 6/2018 | Saxena et al. |
| 2018/0181768 A1 | 6/2018 | Leporini |
| 2018/0189100 A1 | 7/2018 | Nemoto et al. |
| 2018/0191503 A1 | 7/2018 | Alwar et al. |
| 2018/0204111 A1 | 7/2018 | Zadeh |
| 2018/0204213 A1 | 7/2018 | Zappier et al. |
| 2018/0205552 A1 | 7/2018 | Struttmann |
| 2018/0218176 A1 | 8/2018 | Voorhees et al. |
| 2018/0225611 A1 | 8/2018 | Daniel et al. |
| 2018/0232644 A1 | 8/2018 | Acharya et al. |
| 2018/0232659 A1 | 8/2018 | Ranatunga et al. |
| 2018/0239897 A1 | 8/2018 | Ventura |
| 2018/0241573 A1 | 8/2018 | Ramathal |
| 2018/0247191 A1 | 8/2018 | Katz et al. |
| 2018/0253661 A1 | 9/2018 | Strauss |
| 2018/0260125 A1 | 9/2018 | Botes |
| 2018/0260212 A1 | 9/2018 | Wisnovsky |
| 2018/0262505 A1 | 9/2018 | Ligatti |
| 2018/0268401 A1 | 9/2018 | Ortiz et al. |
| 2018/0268483 A1 | 9/2018 | Jayaram |
| 2018/0268506 A1 | 9/2018 | Wodetzki et al. |
| 2018/0276553 A1 | 9/2018 | Redkar et al. |
| 2018/0276626 A1 | 9/2018 | Brendan |
| 2018/0285412 A1 | 10/2018 | Zhuang |
| 2018/0285839 A1 | 10/2018 | Yang |
| 2018/0285996 A1 | 10/2018 | Ma |
| 2018/0300382 A1 | 10/2018 | Madisetti |
| 2018/0307857 A1 | 10/2018 | Beecham |

(56) References Cited

U.S. PATENT DOCUMENTS

| | | |
|---|---|---|
| 2018/0307990 A1 | 10/2018 | Chawla et al. |
| 2018/0311930 A1 | 11/2018 | Sakamoto |
| 2018/0315143 A1 | 11/2018 | Rang |
| 2018/0322485 A1 | 11/2018 | Jayaram |
| 2018/0323963 A1 | 11/2018 | Stollman |
| 2018/0336286 A1 | 11/2018 | Shah |
| 2018/0343238 A1 | 11/2018 | Tola |
| 2018/0365686 A1 | 12/2018 | Kondo |
| 2018/0367528 A1 | 12/2018 | Schwarz et al. |
| 2018/0372502 A1 | 12/2018 | Rønnow |
| 2018/0373776 A1 | 12/2018 | Madisetti |
| 2018/0374173 A1 | 12/2018 | Chen |
| 2019/0012249 A1 | 1/2019 | Mercuri et al. |
| 2019/0012595 A1 | 1/2019 | Beser et al. |
| 2019/0018888 A1* | 1/2019 | Madisetti ............. H04L 9/3236 |
| 2019/0019090 A1 | 1/2019 | Chacko et al. |
| 2019/0028276 A1 | 1/2019 | Pierce et al. |
| 2019/0034404 A1 | 1/2019 | Anderson et al. |
| 2019/0035018 A1 | 1/2019 | Nolan et al. |
| 2019/0042619 A1 | 2/2019 | Baird, III |
| 2019/0050855 A1 | 2/2019 | Martino et al. |
| 2019/0052454 A1 | 2/2019 | Wright et al. |
| 2019/0058581 A1* | 2/2019 | Wood ................... G06F 16/27 |
| 2019/0058709 A1 | 2/2019 | Kempf et al. |
| 2019/0081796 A1 | 3/2019 | Chow et al. |
| 2019/0086988 A1 | 3/2019 | He et al. |
| 2019/0087598 A1 | 3/2019 | Adkins et al. |
| 2019/0087892 A1 | 3/2019 | Pinski et al. |
| 2019/0102409 A1 | 4/2019 | Shi et al. |
| 2019/0102423 A1 | 4/2019 | Little et al. |
| 2019/0108543 A1 | 4/2019 | Chan et al. |
| 2019/0109702 A1 | 4/2019 | Maggu et al. |
| 2019/0109713 A1 | 4/2019 | Clark et al. |
| 2019/0122186 A1 | 4/2019 | Kano et al. |
| 2019/0123892 A1 | 4/2019 | Basu |
| 2019/0132350 A1 | 5/2019 | Smith |
| 2019/0147532 A1 | 5/2019 | Singh et al. |
| 2019/0149325 A1 | 5/2019 | Garagiola et al. |
| 2019/0149334 A1 | 5/2019 | Van Der Velden |
| 2019/0149600 A1 | 5/2019 | Duan |
| 2019/0158270 A1 | 5/2019 | Berti |
| 2019/0164156 A1 | 5/2019 | Lindemann |
| 2019/0164220 A1 | 5/2019 | Raj et al. |
| 2019/0171739 A1 | 6/2019 | Cochrane |
| 2019/0172282 A1 | 6/2019 | Patel |
| 2019/0182047 A1 | 6/2019 | Andreina et al. |
| 2019/0188706 A1 | 6/2019 | McCurtis |
| 2019/0215149 A1 | 7/2019 | Ramasamy et al. |
| 2019/0228006 A1 | 7/2019 | Tormasov et al. |
| 2019/0236559 A1 | 8/2019 | Padmanabhan |
| 2019/0236562 A1 | 8/2019 | Padmanabhan |
| 2019/0236598 A1 | 8/2019 | Padmanabhan |
| 2019/0236606 A1 | 8/2019 | Padmanabhan et al. |
| 2019/0238316 A1 | 8/2019 | Padmanabhan |
| 2019/0238525 A1 | 8/2019 | Padmanabhan et al. |
| 2019/0266601 A1 | 8/2019 | Allen |
| 2019/0268147 A1 | 8/2019 | Baird, III |
| 2019/0287026 A1 | 9/2019 | Calmon et al. |
| 2019/0287116 A1 | 9/2019 | Karantzis |
| 2019/0295114 A1 | 9/2019 | Pavletic et al. |
| 2019/0303121 A1 | 10/2019 | Padmanabhan |
| 2019/0303445 A1 | 10/2019 | Padmanabhan |
| 2019/0303579 A1 | 10/2019 | Reddy et al. |
| 2019/0305935 A1* | 10/2019 | Qiu ....................... H04L 9/0637 |
| 2019/0305950 A1* | 10/2019 | Treat .................... H04L 9/3239 |
| 2019/0306235 A1 | 10/2019 | Veale et al. |
| 2019/0334716 A1 | 10/2019 | Kocsis et al. |
| 2019/0340267 A1* | 11/2019 | Vo ....................... G06F 16/2365 |
| 2019/0347657 A1* | 11/2019 | Guo ..................... G06Q 20/389 |
| 2019/0370634 A1 | 12/2019 | Ferreira et al. |
| 2019/0370866 A1 | 12/2019 | Awbaugh et al. |
| 2019/0377806 A1 | 12/2019 | Padmanabhan et al. |
| 2019/0385160 A1 | 12/2019 | Safak et al. |
| 2019/0386834 A1 | 12/2019 | Furukawa |
| 2020/0019923 A1 | 1/2020 | Santhar et al. |
| 2020/0027005 A1 | 1/2020 | Harrison et al. |
| 2020/0027090 A1 | 1/2020 | Braundmeier |
| 2020/0034448 A1 | 1/2020 | Sato |
| 2020/0034453 A1 | 1/2020 | Sato |
| 2020/0034469 A1 | 1/2020 | Sato |
| 2020/0042939 A1 | 2/2020 | Padmanabhan |
| 2020/0050613 A1 | 2/2020 | Gauvreau, Jr. |
| 2020/0057860 A1 | 2/2020 | Patil et al. |
| 2020/0074477 A1 | 3/2020 | Lamba et al. |
| 2020/0074515 A1 | 3/2020 | Ghatage et al. |
| 2020/0076574 A1 | 3/2020 | Austin et al. |
| 2020/0089663 A1 | 3/2020 | Padmanabhan |
| 2020/0089670 A1 | 3/2020 | Padmanabhan et al. |
| 2020/0089671 A1 | 3/2020 | Padmanabhan et al. |
| 2020/0089672 A1 | 3/2020 | Velisetti et al. |
| 2020/0089895 A1 | 3/2020 | Gollogly |
| 2020/0097924 A1* | 3/2020 | Arora ................... G06Q 20/405 |
| 2020/0104636 A1 | 4/2020 | Halevi et al. |
| 2020/0118011 A1 | 4/2020 | Kaiser et al. |
| 2020/0119906 A1 | 4/2020 | Das |
| 2020/0120019 A1* | 4/2020 | Chen ...................... H04L 45/44 |
| 2020/0133955 A1 | 4/2020 | Padmanabhan et al. |
| 2020/0134613 A1 | 4/2020 | Jiang |
| 2020/0134656 A1 | 4/2020 | Padmanabhan |
| 2020/0143267 A1 | 5/2020 | Gidney |
| 2020/0143372 A1 | 5/2020 | Liu |
| 2020/0167512 A1 | 5/2020 | Chitra |
| 2020/0169546 A1 | 5/2020 | Padmanabhan |
| 2020/0175003 A1* | 6/2020 | Jiang ................... G06Q 20/027 |
| 2020/0186338 A1 | 6/2020 | Andon et al. |
| 2020/0186523 A1 | 6/2020 | Kursun |
| 2020/0210451 A1* | 7/2020 | Wang .................... G06Q 20/02 |
| 2020/0234386 A1 | 7/2020 | Blackman et al. |
| 2020/0250174 A1 | 8/2020 | Padmanabhan et al. |
| 2020/0250176 A1 | 8/2020 | Padmanabhan |
| 2020/0250177 A1 | 8/2020 | Padmanabhan |
| 2020/0250295 A1 | 8/2020 | Padmanabhan |
| 2020/0250661 A1 | 8/2020 | Padmanabhan et al. |
| 2020/0250683 A1 | 8/2020 | Padmanabhan et al. |
| 2020/0250747 A1 | 8/2020 | Padmanabhan |
| 2020/0252202 A1* | 8/2020 | Madl ...................... G06F 21/64 |
| 2020/0252205 A1 | 8/2020 | Padmanabhan |
| 2020/0252404 A1 | 8/2020 | Padmanabhan |
| 2020/0252406 A1 | 8/2020 | Padmanabhan et al. |
| 2020/0278958 A1* | 9/2020 | Zhang ................ G06Q 20/3678 |
| 2020/0287718 A1 | 9/2020 | Hildebrand et al. |
| 2020/0287719 A1 | 9/2020 | Hildebrand et al. |
| 2020/0334677 A1* | 10/2020 | Hari ..................... G06F 16/1834 |
| 2020/0336298 A1* | 10/2020 | Li ......................... H04L 63/123 |
| 2020/0336475 A1 | 10/2020 | Padmanabhan et al. |
| 2020/0344132 A1 | 10/2020 | Padmanabhan |
| 2020/0349142 A1 | 11/2020 | Padmanabhan |
| 2020/0349564 A1 | 11/2020 | Padmanabhan et al. |
| 2020/0357084 A1 | 11/2020 | Lerato et al. |
| 2021/0004774 A1* | 1/2021 | Ramgopal ............. H04L 9/0643 |
| 2021/0150065 A1* | 5/2021 | Qiu ....................... H04L 9/3247 |
| 2021/0152535 A1 | 5/2021 | Padmanabhan et al. |
| 2021/0152536 A1 | 5/2021 | Padmanabhan et al. |
| 2021/0157801 A1* | 5/2021 | Yang .................. G06F 16/2379 |
| 2021/0160252 A1* | 5/2021 | Qiu ....................... H04L 67/565 |
| 2021/0166231 A1 | 6/2021 | Han |
| 2021/0182423 A1 | 6/2021 | Padmanabhan |
| 2021/0226774 A1 | 7/2021 | Padmanabhan |
| 2021/0243193 A1 | 8/2021 | Padmanabhan |
| 2021/0248605 A1* | 8/2021 | Qiu ....................... H04L 9/3239 |
| 2021/0279761 A1* | 9/2021 | Olson ................ G06Q 30/0226 |
| 2022/0005072 A1* | 1/2022 | Chhipa ............... G06Q 30/0255 |
| 2022/0006705 A1 | 1/2022 | Padmanabhan |
| 2023/0035321 A1* | 2/2023 | Vijayaraghavan .... G06F 40/279 |

FOREIGN PATENT DOCUMENTS

| | | | |
|---|---|---|---|
| CN | 109173261 A | | 1/2019 |
| CN | 110035046 A | * | 7/2019 ......... H04L 63/0428 |
| CN | 111919417 A | | 11/2020 |
| EP | 3747153 A1 | | 12/2020 |
| JP | 2020-541893 A | | 5/2021 |
| WO | 2016/161073 A1 | | 10/2016 |
| WO | 2018/007827 A1 | | 1/2018 |

(56) References Cited

FOREIGN PATENT DOCUMENTS

| WO | 2018/007828 A2 | 1/2018 | | |
|---|---|---|---|---|
| WO | 2018/194707 A1 | 10/2018 | | |
| WO | 2018/230581 A1 | 12/2018 | | |
| WO | WO-2018232494 A1 * | 12/2018 | ............. | G06Q 40/04 |
| WO | WO-2019042101 A1 * | 3/2019 | ......... | G06F 16/2365 |
| WO | 2019/152750 A1 | 8/2019 | | |
| WO | 2020160109 A1 | 8/2020 | | |

OTHER PUBLICATIONS

Kan Luo, A Multiple Blockchains Architecture on Inter-Blockchain Communication, 2018, IEEE (Year: 2018).*
Hai Jin, Towards a Novel Architecture for Enabling Interoperability Amongst Multiple Blockchains, 2018, IEEE (Year: 2018).*
Wenli Yang, A Survey on Blockchain-Based Internet Service Architecture: Requirements, Challenges, Trends, and Future, IEEE, Apr. 12, 2019 (Year: 2019).*
Hoang Tam Vo, Internet of Blockchains: Techniques and Challenges Ahead, IEEE, 2018 (Year: 2018).*
"How Creating Digital Twins on Blockchain Will Protect Brands?", dated Nov. 15, 2018, 4 pages.
Azaria et al., "MedRec: Using Blockchain for Medical Data Access and Permission Management," 2016 2nd International Conference on Open and Big Data, IEEE, Aug. 22, 2016, pp. 25-30.
BigchainDB GmbH, "BigchainDB 2.0 : The Blockchain Database," Berlin, Germany, Paper version 1.0, May 2018, 14 pages.
Deloitte, "IoT Powered by Blockchain", Blockchain Institute, May 2018, 20 pages.
Final Office Action, U.S. Appl. No. 15/885,803, dated Jul. 20, 2020, 29 pages.
Final Office Action, U.S. Appl. No. 15/885,811, dated Aug. 5, 2020, 45 pages.
Final Office Action, U.S. Appl. No. 15/932,099, dated Jun. 1, 2020, 26 pages.
Genestier et al., "Blockchain for Consent Management in the eHealth Environment: A Nugget for Privacy and Security Challenges", Journal of the International Society for Telemedicine and eHealth, Jan. 1, 2017, 4 pages.
International Search Report and Written Opinion, PCT App. No. PCT/US2019/016199, dated Apr. 2, 2019, 11 pages.
International Search Report and Written Opinion, PCT App. No. PCT/US2019/036103, dated Aug. 1, 2019, 10 pages.
International Search Report and Written Opinion, PCT App. No. PCT/US2020/015618, dated May 11, 2020, 11 pages.
Mcconaghy et al., "BigchainDB: A Scalable Blockchain Database (DRAFT)", Jun. 8, 2016, 70 pages.
Nasdaq, "Using the Blockchain to Track Assets for Proof of Ownership", Nov. 30, 2016, 19 pages.
Non-Final Office Action, U.S. Appl. No. 15/885,803, dated Jan. 8, 2020, 47 pages.
Non-Final Office Action, U.S. Appl. No. 15/885,811, dated Jan. 17, 2020, 40 pages.
Non-Final Office Action, U.S. Appl. No. 15/932,092, dated Jan. 22, 2020, 36 pages.
Non-Final Office Action, U.S. Appl. No. 15/932,099, dated Oct. 3, 2019, 26 pages.
Non-Final Office Action, U.S. Appl. No. 15/932,100, dated Nov. 8, 2019, 9 pages.
Non-Final Office Action, U.S. Appl. No. 15/940,646, dated Apr. 29, 2019, 7 pages.
Non-Final Office Action, U.S. Appl. No. 16/177,305, dated Jul. 23, 2020, 40 pages.
Non-Final Office Action, U.S. Appl. No. 16/264,657, dated Sep. 18, 2020, 33 pages.
Non-Final Office Action, U.S. Appl. No. 16/683,945, dated Sep. 14, 2020, 26 Pages.
Notice of Allowance, U.S. Appl. No. 15/940,646, dated Oct. 31, 2019, 8 pages.
Notice of Allowance, U.S. Appl. No. 16/264,653, dated Nov. 23, 2020, 15 pages.
Notice of Allowance, U.S. Appl. No. 15/932,100, dated Feb. 20, 2020, 5 pages.
O'Neill, Jacqueline, "How Smart Certificates of Authenticity Improve Asset Management", Medium, Jan. 17, 2019, 4 pages.
Office Action, EP App. No. 19707168.1, dated Sep. 24, 2020, 3 pages.
Ojha, Varun, "Chaincode for Go Developers, Part 1: Writing Blockchain Chaincode in Go for Hyperledger Fabric v0.6", Mar. 2017, 15 pages.
Peterson et al., "A Blockchain-Based Approach to Health Information Exchange Networks," Aug. 8, 2016, Retrieved from the Internet: URL: http://kddlab.zjgsu.edu.cn:7200/research/blockchain/huyiyang-reference/A%20BlockchainBased%20Approach%20to%20Health%20Information%20Exchange.pdf, Retrieved on Mar. 21, 2019, 10 pages.
Salesforce, "Force.com Apex Code Developer's Guide," version 34.0, 2015, 2296 pages.
Sandgaard et al., "MedChain White Paper V1.1," Oct. 1, 2017, Retrieved from the Internet: URL:https://www.medchain.global/doc/Medchain%20Whitepaper%20v1.1.pdf, Retrieved on Mar. 21, 2019, 53 pages.
Sawtooth, "Using Sawtooth with Docker: Configuring the List of Transaction Families", Apr. 6, 2018, 14 pages.
Wikipedia, "Federated database system", https://en.wikipedia.org/w/index.php/?title=Federated%20database%20system&oldid=808166410, Jun. 8, 2016, 5 pages.
Wikipedia, "Solidity", https://web.archive.org/web/2017020202304/https://en.wikipeida.org/wiki/Solidity, Feb. 2, 2017, 4 pages.
Zyskind et al., "Decentralizing Privacy: Using Blockchain to Protect Personal Data," 2015 IEEE Security and Privacy Workshops, May 2015, 5 pages.
U.S. Appl. No. 17/348,286, filed Jun. 15, 2021, Prithvi Krishnan Padmaabhan.
Bendor-Samuel, P. (Jun. 2017) Blockcham-enabled smart-contracts solve problems in administering IT ecosystem services, CIO, 3 pages.
Final Office Action for U.S. Appl. No. 16/177,305 dated Feb. 2, 2021, 47 pages.
Final Office Action for U.S. Appl. No. 16/264,657 dated May 17, 2021, 36 pages.
Non-Final Office Action, U.S. Appl. No. 16/399,920, dated Feb. 17, 2022, 38 pages.
Normans Media Ltd., Smart Contracts: Blockchain-based contracts that don't require lawyers. Nov. 2016, 4 pages.
Notice of Allowance for U.S. Appl. No. 16/264,653 dated Jun. 7, 2021, 21 pages.
Notice of Allowance for U.S. Appl. No. 16/683,945, dated Feb. 10, 2021, 14 pages.
Office Action for U.S. Appl. No. 15/885,803, dated Apr. 14, 2021, 31 pages.
Office Action for U.S. Appl. No. 15/932,092 dated Mar. 17, 2021, 23 pages.
Office Action for U.S. Appl. No. 16/177,300 dated Jun. 16, 2021, 80 pages.
Office Action for U.S. Appl. No. 16/683,945, dated Sep. 14, 2020, 18 pages.
Shukla, A., et al., "Smart Contracts for Multiagent Plan Execution in Untrusted Cyber-physical Systems," 2018 IEEE 25th International Conference on High Performance Computing Workshops (HiPCW), Dec. 2018, 10 pages.
Final Office Action for U.S. Appl. No. 15/885,803 dated Nov. 17, 2021, 28 pages.
Final Office Action for U.S. Appl. No. 15/885,811, dated Feb. 3, 2022, 38 pages.
Final Office Action for U.S. Appl. No. 15/932,092 dated Sep. 27, 2021, 25 pages.
Final Office Action for U.S. Appl. No. 15/932,099 dated Nov. 1, 2021, 35 pages.
Mandal, "A Framework for Modular Norm Extraction, Modeling, and Reasoning," doctoral dissertation, University of Nebraska, Jul. 2017, 151 pages, ProQuest Dissertations Publishing.

(56) References Cited

OTHER PUBLICATIONS

Non-Final Office Action for U.S. Appl. No. 15/885,811 dated Aug. 4, 2021, 26 pages.
Non-Final Office Action for U.S. Appl. No. 16/177,305 dated Sep. 16, 2021, 42 pages.
Non-Final Office Action for U.S. Appl. No. 16/264,645 dated Oct. 27, 2021, 46 pages.
Non-Final Office Action for U.S. Appl. No. 16/777,409 dated Oct. 4, 2021, 42 pages.
Non-Final Office Action for U.S. Appl. No. 16/917,506, dated Oct. 4, 2021, 44 pages.
Norta, et al., "Self-Aware Agent Supported Contract Management on Blockchains for Legal Accountability," Jun. 2017, 37 pages.
Notice of Allowance for U.S. Appl. No. 16/177,300, dated Oct. 6, 2021, 14 pages.
Notice of Allowance for U.S. Appl. No. 16/264,653 dated Sep. 29, 2021, 17 pages.
Notice of Allowance for U.S. Appl. No. 16/683,932 dated Dec. 3, 2021, 9 pages.
Office Action for U.S. Appl. No. 16/399,913, dated Dec. 24, 2021, 51 pages.
Final Office Action, U.S. Appl. No. 16/399,920, dated Aug. 1, 2022, 63 pages.
Abdellatif et al. Formal verification of smart contracts based on users and blockchain behavior models. Conference Paper Feb. 2018. DOI 10.1109/NTMS.2018.8328737, 6 pages, Retrieved via Research Gate on [Dec. 4, 2023].
Alessi et al.,"Make users own their data: a decentralized personal data store prototype based on Ethereum and IPFS; "2018, 10 pages, 3rd International Conference on Smart and Sustainable Technologies (SpliTech). (Year: 2018).
Cai et al., "BCSolid: A Blockchain-Based Decentralized Data Storage and Authentication Scheme for Solid;" Springer Nature Singapore Pte Lid. 2020, Z. Zheng et al. (Eds.): BlockSys 2019, CCIS 1156, pp. 676-689, 2020. (Year: 2020).
Duan et al. Formal Modeling and Verification of Blockchain System. ICCMS 2018, Jan. 8-10, 2018, Sydney, Australia ©2018 Association for Computing Machinery, 5 pages, ACM ISBN 978-1-4503-6339-Jun. 18, 2001. https://doi.org/10.1145/3177457.3177485. (Year: 2018).
Hu, Y.C. et al., "Analyzing smart contract interactions and contract level state consensus," Concurrency and Compulation: Practice and Experience 32, 202G, 17 pages.
Jackson, "Understanding the Implication of Blockchain Technology on the Audit Profession;" 2018, Honors Undergraduate Theses; 421; 51 pages, https://slars.library.ucf.edu/honorstheses/421. (Year: 2018).
Kalra, S. et al., "ZEUS: Analyzing Safety of Smart Contracts," In NDSS Feb. 18, 2018, pp. 1-15.
Mao et al. Visual and User-Defined Smart Contract Designing System Based on Automatic Coding. © 2019 IEEE Access. vol. 7, 2019. DOI: 10.1109/ACCESS.2019.2920776. 13 pages (Year: 2019).
Office Action (Final Rejection) dated May 15, 2023 for U.S. Appl. No. 16/777,141 (pp. 1-35).
Office Action (Non-Final Rejection) dated May 25, 2023 for U.S. Appl. No. 16/399,913 (pp. 1-23).
Notice of Allowance dated May 26, 2023 for U.S. Appl. No. 16/777,073 (pp. 1-11).
Salah, K. et al., "Blockchain for AI: Review and Open Research Challenges," IEEE, vol. 7, 2019, 23 pages.
Office Action (Final Rejection) dated Jun. 22, 2023 for U.S. Appl. No. 15/932,092, 42 pages.
Notice of Allowance dated Jun. 30, 2023 for U.S. Appl. No. 16/399,920 (pp. 1-13).

* cited by examiner

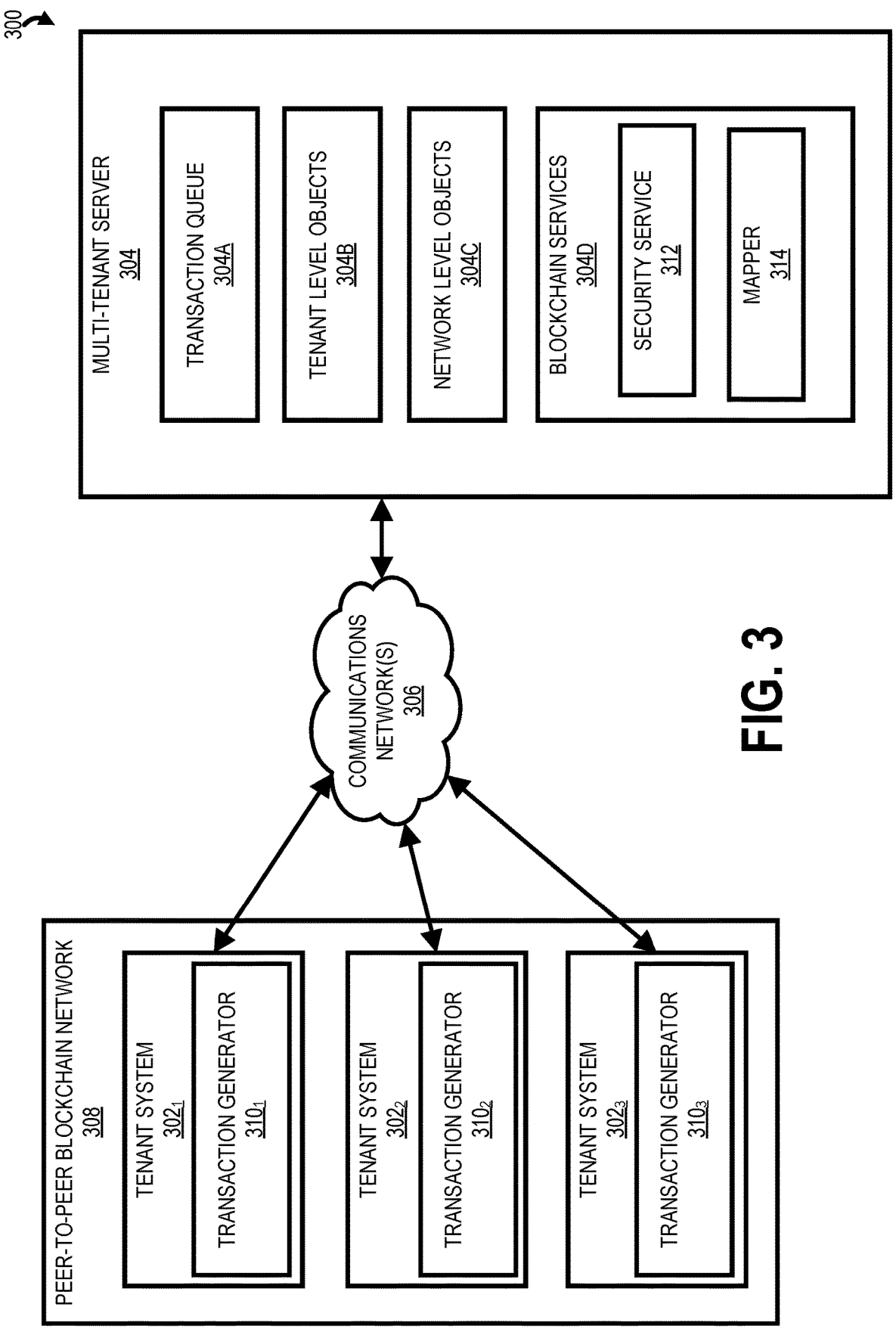

| TRANSACTION OBJECT 902 | | |
|---|---|---|
| EXCHANGE FIELD $604_1$ | EXCHANGE FIELD $604_2$ | EXCHANGE FIELD $604_3$ |
| FIELD VALUE $806_{1,2}$ | FIELD VALUE $806_{1,N}$ | FIELD VALUE $806_{1,1}$ |

FIG. 9

SYSTEM AND METHOD OF PROVIDING INTEROPERABLE DISTRIBUTED AND DECENTRALIZED LEDGERS USING CONSENSUS ON CONSENSUS AND DELEGATED CONSENSUS

TECHNICAL FIELD

One or more implementations relate to the field of data management; and more specifically, to enabling interoperability between blockchain networks with different architectures and protocols.

BACKGROUND

A blockchain is a continuously expanding list of records/blocks that are linked and secured using cryptography. In particular, every block in a blockchain may include a cryptographic hash of the immediately preceding block, a timestamp for the current block, and transaction data (e.g., the addition/modification of information associated with a peer in a blockchain network). Further, the blockchain may be shared and managed through a peer-to-peer network via a system of verifying/validating new blocks to be added to the chain such that a block in a blockchain cannot be altered without alteration of all subsequent blocks, which requires network consensus. This architecture allows for security of information stored within blocks through the use of cryptography; sharing/distribution of information through the use of peer-to-peer networks; trust through the use of consensus of block addition; and immutability of information stored within blocks through the use of cryptography, chaining/linking of blocks, and peer distribution (e.g., each peer in the blockchain network may maintain a ledger of all verified/validated transactions in the network).

There are different blockchain architectures where different encryption algorithms are utilized, the blocks of the blockchain have differing data fields and where different consensus algorithms are utilized. Due to these differences between blockchain networks the blockchain and transactions stored within one blockchain network are not interoperable with other blockchain networks. Even where similar encryption and consensus algorithms are utilized, different blockchain networks will have different configurations and different set of participating nodes.

Consensus algorithms in blockchain architectures are distributed algorithms where the participating nodes implement a process to agree on the transactions to validate and the blocks to add to the blockchain. There are four primary consensus algorithms utilized in blockchain networks, namely, practical byzantine fault tolerance algorithm (PBFT), proof of work (PoW), proof of stake (PoS), and delegated proof of stake (DPoS). Each of these consensus algorithms can be utilized in a decentralized and distributed decision making scenario such as in blockchain networks.

While a given blockchain network is an open and public type of decentralized database. Each blockchain network operates independently from all other blockchain networks. A user could interact separately with multiple blockchain networks, but such interaction would require the user to independently interact with each blockchain network according to the protocols of each network without any mechanisms to correlate information and transactions in one blockchain network with the information and transactions of another blockchain network.

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 3 shows a block diagram illustrating a computing environment, including a multi-tenant server, according to one example implementation.

FIG. 9 shows an example of a transaction object, according to one example implementation.

DETAILED DESCRIPTION

Figure 1:
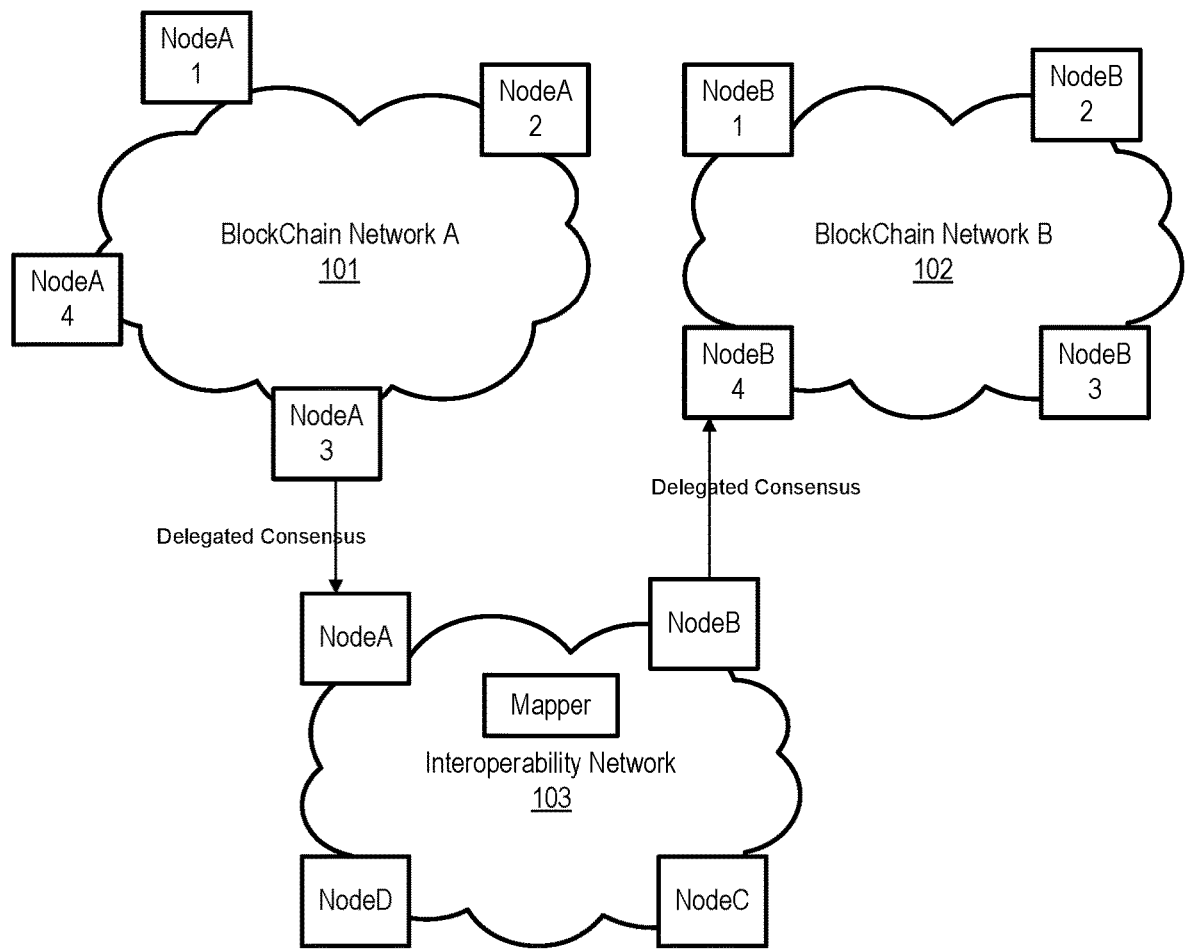
FIG. 1 is a block diagram of one embodiment of an interoperability network in communication with a set of blockchain networks.

FIG. 1 is a block diagram of one embodiment of an interoperability network servicing a set of blockchain networks. In the example of FIG. 1 the interoperability network 103 is in communication with blockchain network A 101 and blockchain network B 102. However, the interoperability network 103 can service any number and variety of blockchain networks. The example of the interoperability network 103 servicing two blockchain networks is provided by way of example and not limitation. One skilled in the art would understand that the principles, structures, and operations of the interoperability network 103 can service any number and combination of blockchain networks.

The blockchain network A 101 and blockchain network B 102 can each include any number of participating nodes (e.g., nodes A1-4 and nodes B1-4, respectively) and implement any combination of blockchain technologies. The architecture of blockchain network A 101 and blockchain network B can differ in any aspect and any number of aspects. The blockchain network A 101 and blockchain network B 102 can implement any blockchain protocols including any blockchain block and transaction format and any consensus algorithm. Examples of existing blockchain protocols are utilized as part of cryptocurrencies (e.g., Bitcoin, and Ethereum), for data storage, smart contracts, and similar applications. Blockchain can be utilized in relation to customer relations management (CRM), for example tracking user loyalty points and similar data. In one example embodiment, provided for purpose of illustration, blockchain network A 101 is a Salesforce blockchain network that manages CRM data.

The blockchain network A 101 can include any number of participating nodes that either participate in the consensus protocol, mine blocks, and/or provide storage for the blockchain. The blockchain network A manages at least one blockchain that stores data and metadata. Metadata can include any descriptive information related to the transactions and blocks of transactions in the blockchain of blockchain network A 101. The blockchain of blockchain network A 101 can be any size and contain any number of blocks and any type of data stored therein consistent with the blockchain protocol implemented by the blockchain network A 101.

Similarly, the blockchain network B 102 can include any number of participating nodes that either participate in the consensus protocol, mine blocks, and/or provide storage for the blockchain. The blockchain network B 102 manages at least one blockchain that stores data and metadata. The metadata of blockchain network B 102 will differ from that of blockchain network A 101 and can include any descriptive information related to the transactions and blocks of transactions in the blockchain of blockchain network B 102. The blockchain of blockchain network B 102 can be any size and contain any number of blocks and any type of data stored therein consistent with the blockchain protocol implemented by the blockchain network B 102.

In the illustrated example, the blockchain network A 101 includes a set of participant nodes A1-A3. Similarly, the blockchain network B 102 includes a set of participant nodes B1-B3. These nodes implement the respective blockchain consensus algorithm of each blockchain network (e.g., a proof of stake, proof of work or similar consensus algorithm). The participant nodes A1-3 and B1-3 can participate in the consensus algorithm, blockchain storage, block mining and similar aspects of the blockchain management of the respective blockchain network. As mentioned, the blockchain network A 101 and blockchain network B 103 operate independently and do not have a capability to directly access or affect the transactions and content of the blockchain in the other blockchain networks, even where a relationship between the data in the two blockchain networks may be relevant to a user of both blockchain networks.

The embodiments provide an interoperability network 103 to enable each blockchain network to interact with the data in the blockchain of the other blockchain networks connected to the interoperability network 103. The interoperability network 103 can also be a separate blockchain network. The interoperability network 103 can include any number of participating nodes that either participate in the consensus protocol, mine blocks, and/or provide storage for the blockchain of the interoperability network 103. The interoperability network 103 manages at least one blockchain that stores data and metadata. The interoperability network 103 also includes at least one mapper 117 that maps the metadata of each connected blockchain network to each of the other blockchain networks that participate in the interoperability network 103. The mapper can utilize declarative mappings and/or derived mappings from the interoperability network 103 blockchain. The interoperability network 103 blockchain is a combination of the data from all of the connected blockchain networks. The interoperability network 103 participates or subscribes to each of the participating blockchain networks to add blocks with data equivalent to each of the blocks of the connected blockchain networks as they are added to the respective networks. Metadata mappings can include any correlations between any of the metadata or regular data fields of the different blockchain networks including mappings of the descriptive information related to the transactions and blocks of transactions in the blockchains of blockchain network A 101 and blockchain network B 103. The blockchain of interoperability network 103 can be any size and contain any number of blocks and any type of data stored therein consistent with the blockchain protocol implemented by the interoperability 103.

The interoperability network 103 supports a delegated consensus process and a consensus on consensus process whereby the interoperability network 103 receives a delegated consensus from one serviced blockchain network and then determines another blockchain network that can resolved the delegated consensus, maps the delegated consensus to the metadata format and data format of the identified blockchain network, and then forwards the transformed delegated consensus to the identified blockchain network. The interoperability network 103 then receives a resolution of the delegated consensus from the identified blockchain network upon which consensus is performed creating a consensus on consensus, the outcome of which is returned to the blockchain network that initially delegated the consensus to the interoperability network 103, which enables the initial blockchain network and user to resolve the delegated consensus of the initial blockchain network. In turn, the initial blockchain network can notify the interoperability network 103, which enables the interoperability network 103 to complete the resolution of the set of related delegated consensus requests.

The operation of the interoperability network 103 can be understood with reference to the illustrated example of FIG. 1. In this example, the blockchain network 1 implements a blockchain that stores product information for a retailer. A user may interface with a node of the blockchain network A 101 to initiate a transaction to purchase a product offered by the retailer. The user may seek to pay for the product using a cryptocurrency managed by blockchain network B 102. However, the blockchain network A 101 is not able to directly process a transaction involving the cryptocurrency on its own. The interoperability network 103 enables the interaction and sharing of data between two blockchain networks.

The interoperability network 103 facilitates interoperability by mapping transactions from one blockchain network (e.g., blockchain network A 101) into another blockchain network (e.g., blockchain network B 102). In this example, blockchain network A 101 processes the product purchase transaction to confirm that the retailer has a product available by searching the blockchain in blockchain network A 101 for inventory and begins a consensus process that emits a transaction that can include an entity type (product), entity data (product code or similar information), cost (e.g., in cryptocurrency value), and user or similar information. Blockchain network A 101 cannot resolve the transaction and delegates final consensus to the interoperability network 103.

The blockchain network A 101 and its constituent nodes need not have specific knowledge of the interoperability network 103. A node or set of nodes of the interoperability network 103 can participate in or monitor the transactions of the blockchain network A 101. The node that participates in the blockchain network A 101 can vary or be dynamically selected to prevent a given node from interfering with interoperability and to distribute load. A mapper 107 can implement the transaction servicing and mapping in the interoperability network and can be implemented at any node of the interoperability network 103 or can be a distributed process. The emitted transaction of blockchain network A 101 awaits final consensus and thereby delegates consensus to the interoperability network 103.

The interoperability network 103 processes the emitted transaction via the mapper 107, which identifies mappings for the blockchain network 101 to apply to the emitted transaction. The mappings can be declarative (e.g., defined by developers or similar entity associated with blockchain network A 101) or derived (e.g., from an associated smart contract). The mappings can be a one-to-one or many-to-many relationship. The mapper 107 identifies the mappings to be applied by determining each of the other blockchain networks that are needed to resolve the transaction. The mapper 107 can examine the fields and values of the transaction and compare with the blockchain of the interoperability network 103 to find matches. In the example, a search of the blockchain of interoperability network 103 can find a match between the user and cryptocurrency in the emitted transaction in a block that originated from blockchain network B 102. Matches with multiple blockchain networks are possible. With each map the transaction received from blockchain network A 101 can be mapped to a transaction in a matching blockchain network using mappings specific to the relationship between the blockchain network that emitted the transaction and the blockchain network with matching data. The interoperability network 103 can then emit the transformed transaction to the respective blockchain network.

The interoperability network 103 includes nodes that are participating in each blockchain network. In the example, node B in the interoperability network 103 is designated dynamically to emit the transformed transaction for blockchain network B 102. In this manner the interoperability network 103 delegates consensus to the blockchain networks with relevant data, in this example, blockchain network B 102. The blockchain networks receiving transformed transactions process them as any internally generated transaction. In this example, the blockchain network B is a cryptocurrency blockchain that would deduct the cost of the product in cryptocurrency from the cryptocurrency held by the user. If the user has sufficient currency, then the transaction would be validated, and consensus reached in blockchain network B 102. The blockchain network B 102 would add the transformed transaction as a block to its blockchain.

The interoperability network 103 network would receive via the participating nodes of the blockchain network B 102 (e.g., node B) the outcome of the consensus algorithm. If consensus was not reached in blockchain network B 102, then the failure of the transaction would cascade back to the originating blockchain network A 101. For example, if the user did not have sufficient cryptocurrency for the transaction, consensus would not be reached, and the transaction would not be added to the blockchain of blockchain network B 102. The interoperability network 103 would then examine its state upon monitoring the failed consensus and determine that it was awaiting the outcome of the transaction to complete its own consensus process. Transactions can be tracked based on a transaction identifier, which can be any explicit or derived value unique to a given transaction. Thus, the consensus algorithm for the transformed transaction would similarly fail in the interoperability network 103. In turn, the node A participating in blockchain network A 101 would relay the failed transaction to cause the delegated consensus of blockchain network A 101 to similarly fail.

If the blockchain network B 102 does reach consensus and ad the transaction to its blockchain, then the interoperability network 103 would continue its consensus algorithm in response by examining the state of the consensus algorithm in light of the consensus of the blockchain network B 102. If the interoperability network 103 has detected that all transformed transactions have reached consensus in their respective blockchain networks, then the interoperability network 103 can reach consensus on consensus. In addition to the delegated consensus the interoperability network 103 can also examine additional criteria in reaching consensus such network conditions, timeliness and similar criteria. The interoperability network 103 adds a block to its blockchain for a transaction that is committed to the blockchain network B 102.

The blockchain network A 101 receives the consensus on consensus from the interoperability network 103 via the participating node A. The blockchain network A 101 can then complete its consensus algorithm which is also a consensus on consensus scenario. The blockchain network A 101 completes its consensus algorithm and commits the transaction to its blockchain. The interoperability network 103 receives the result of this consensus via a participating node (e.g., node A) and completes its consensus algorithm, as another consensus on consensus scenario. As a result, the transaction of blockchain A 101 is added to the blockchain of the interoperability network 103 thereby completing the overall process such that the original transaction of blockchain network 101 has utilized the data and update blockchain network B 102 as facilitated by the interoperability network 103 and the mapper 107.

Figure 2:
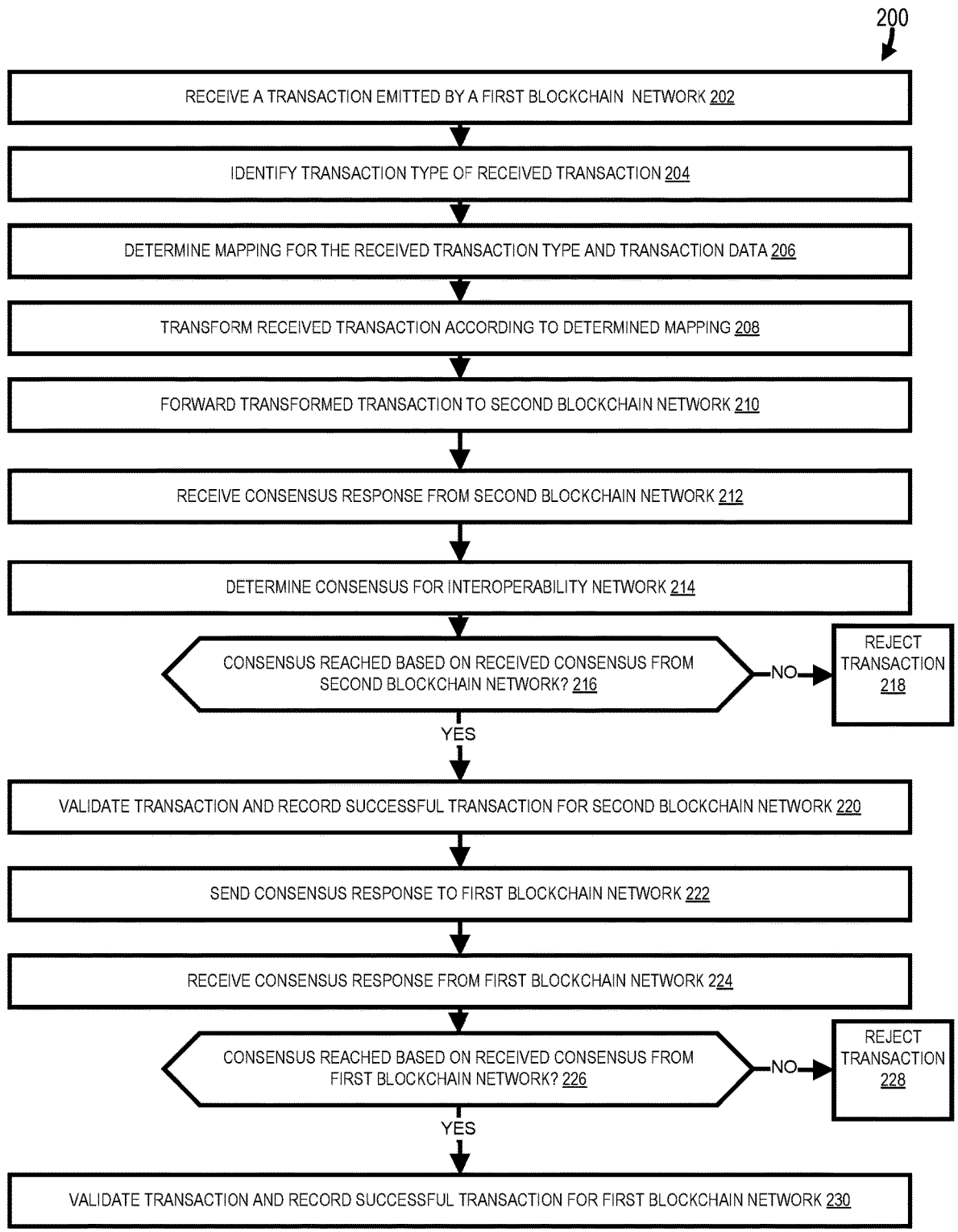
FIG. 2 is a flowchart of one embodiment of a mapper in an interoperability network.

FIG. 2 is a flowchart of one embodiment of a mapper in an interoperability network. The mapper responds to receiving a transaction emitted by a first blockchain network in communication with the interoperability network (Block 202). The mapper examines the received transaction to identify a type of the transaction (Block 204). For example, the transaction can include any number of fields of data or metadata that can define the type of the transaction. The mapper can utilize the transaction type to determine a mapping (if any) to be applied to the received transaction (Block 206). In some cases, in addition to the transaction type a match with data in the blockchain that indicates a set of target blockchain networks that can be utilized to determine a mapping to transform the received transaction to a format of the target blockchain networks. The identified mappings can then be applied to transform the received transaction to a format for transactions in a second blockchain network (Block 208). The mappings can define transformations of fields in a transaction of a first blockchain network to fields of a transaction for a second blockchain network. In some cases, the mapping can define a format or template of a transaction for the second network in combination with the mapping of the fields in the transaction. This mapping can include correlating metadata of the received transaction from the first blockchain network to fields of the transaction of the second blockchain network. The correlation between the fields and metadata of the first transaction can be a one-to-one, many-to-many, or one-to-many relationship. The mappings can be declarative and generated by users of the interoperability network, the blockchain network into which the transaction is being forwarded or the forwarding blockchain network. One skilled in the art would appreciate that a received transaction can be transformed into multiple transactions according to mappings for multiple target blockchain networks. For sake of clarity, the process is described in terms of a translation for a second blockchain network, but the process can transform the received transaction into multiple transactions for different target blockchains according to the mappings and transaction types.

The transformed transaction can then be forwarded to the second blockchain network (Block 'B10). The forwarding of the transformed transaction can be via a node of the interoperability network that is participating in the second blockchain network. The mapper of the interoperability network can than await receipt of a result of the consensus algorithm of the second blockchain network. Upon receipt of the consensus of the second blockchain network (Block 212) either in the form of a rejected transaction or committed transaction, the mapper determines consensus (i.e., a form of consensus on consensus) for the interoperability network (Block 214). The interoperability network can find consensus (Block 216) where each of the target blockchain networks return a commitment of the respective transformed transaction. In some embodiments, additional criteria can be included in the consensus algorithm of the interoperability network. Where consensus is not reached by the interoperability network then the received transaction is rejected (Block 218), which is related to the first blockchain network causing the originating transaction to fail to commit.

If the interoperability network reaches consensus based on the consensus on consensus with the target networks, then the transaction is validated, and the transaction is recorded for the transaction of the second blockchain network (Block 220). The successful consensus is relayed to the first blockchain network via a node of the interoperability network that participates in the first blockchain network (Block 222). The mapper of the interoperability network can than await receipt of a result of the consensus algorithm of the first blockchain network. Upon receipt of the consensus of the first blockchain network (Block 224) either in the form of a rejected transaction or committed transaction, the mapper determines a second consensus (i.e., a form of consensus on consensus) for the interoperability network (Block 226). The interoperability network can find consensus where the first blockchain network returns a commitment of the initial transaction. In some embodiments, additional criteria can be included in the consensus algorithm of the interoperability network. Where consensus is not reached by the interoperability network then the received transaction is rejected (Block 228). If consensus on consensus is reached, then the transaction of the first blockchain network is validated and the transaction is added to the blockchain of the interoperability network (Block 230).

FIG. 3 is a block diagram illustrating a computing environment 300, according to one example implementation. The computing environment 300 includes tenant systems $302_1$-$302_3$, a multi-tenant server 304, and a set of communications networks 306. In this example computing environment 300, the tenant systems $302_1$-$302_3$ may be part of a peer-to-peer blockchain network 308 and the multi-tenant server 304 provides a cloud environment to manage data and transactions of the tenant systems $302_1$-$302_3$ in the peer-to-peer blockchain network 308 via a transaction queue 304A, tenant level objects 304B, network level objects 304C, and blockchain services 304D, including a security service 312. For example, the blockchain services 304D may generate mapping data that maps fields of physical objects of tenant systems 302 to exchange fields, which are used for processing transactions in the peer-to-peer blockchain network 308. Additionally, the blockchain services 304D may generate public and private keys for each tenant system 302 in the blockchain network 308 and assign/enforce permissions/privileges in relation to exchange fields using these keys. Namely, exchange fields may be encrypted using private and/or public keys of tenant systems 302 that are permitted to access these fields and separate sets of keys may be provided to corresponding tenant systems 302 for different permission/privilege levels.

The interoperability network can be implemented at least in part as a peer-to-peer blockchain network 308 as illustrated in one example embodiment. The blockchain networks that are serviced by the interoperability network can similarly be implemented as a peer-to-peer blockchain network 308. The example of FIG. 3 is provided by way of example for blockchain network and the blockchain functions of the interoperability network implementation. One skilled in the art would appreciate that other analogous blockchain network and blockchain function implementations are also possible and any combination thereof. The example peer-to-peer blockchain network 308 is composed of nodes or peers that may be within a single network or cloud platform or may be distributed over multiple networks, cloud platforms and similar nodes.

In this example, as will be described in greater detail below, a transaction generator $110_1$ of the tenant system $302_1$ may generate a request to (1) add/insert a new record to/into a physical object associated with the tenant system $302_1$ or (2) modify/update an existing record of the physical object associated with the tenant system $302_1$. The physical object may include a set of fields for each record and is stored in a portion/partition of the tenant level objects 304B of the multi-tenant server 304 associated with the tenant system $302_1$ such that a physical object is only accessible to the tenant system $302_1$ (e.g., the tenant system $302_2$ and the tenant system $302_3$ are not permitted to read or write to the physical object of the tenant system $302_1$) where a physical object is a committed block or similar data structure in a blockchain. The request may cause the addition of a record in a shadow object in the portion/partition of a tenant level objects 304B associated with the tenant system $302_1$. The shadow object represents uncommitted data related to a physical object (i.e., data for which a consensus amongst the peers/tenants in the peer-to-peer blockchain network 308 has not yet been achieved). The shadow object may be used by the transaction queue 304A for generating a transaction object, which will be distributed/made available to the other tenant systems $302_2$ and $302_3$ for receiving consensus for the proposed addition/modification to the physical object of the tenant system $302_1$.

In one implementation, the set of fields of the transaction object is a subset of the fields of the physical object and the set of fields of the transaction object are defined by an exchange object, which is included in the network level objects 304C. In this implementation, the exchange object may include a set of exchange fields, which will be included in the transaction object, and each exchange field of the exchange object may be mapped to a field in the physical objects of the tenant systems $302_1$-$302_3$. For example, a physical object of the tenant system $302_1$ may include fields A-D, a physical object of the tenant system $302_2$ may include fields E-H, and a physical object of the tenant system $302_3$ may include fields I-K. In this example, a first exchange field of the exchange object of the peer-to-peer blockchain network 308 may be mapped to the field B of the tenant system $302_1$, the field F of the tenant system $302_2$, and the field I of the tenant system $302_3$. Similarly, a second exchange field of the exchange object of the peer-to-peer blockchain network 308 may be mapped to the field C of the tenant system $302_1$, the field E of the tenant system $302_2$, and the field J of the tenant system $302_3$. Accordingly, when a proposal for adding/modifying a record for the physical object of the tenant system $302_1$ is received, the corresponding transaction object includes the first exchange field with a value from field B of the proposed physical/shadow object and the second exchange field with a value from field C of the proposed physical/shadow object. The exchange object provides a uniform transaction object via mapping metadata for verification/validation purposes in the peer-to-peer blockchain network 308 while allowing the tenant system $302_1$ to only reveal particular portions of information to other tenants/peers in the peer-to-peer blockchain network 308 (e.g., sensitive information/fields in physical objects may not be included in transaction objects which are distributed amongst tenant systems $302_1$-$302_3$ in the peer-to-peer blockchain network 308 and later included in distributed ledgers).

As described herein, the multi-tenant server 304 may perform many of the functions of the peer-to-peer blockchain network 308 on behalf of the tenant systems $302_1$-$302_3$. In particular, the multi-tenant server 304 may include a virtual space/organization for each of the tenant systems $302_1$-$302_3$. Each virtual space/organization may include data and applications/services for corresponding tenant systems $302_1$-$302_3$ and is logically separate from all other virtual spaces/organizations of other tenant systems $302_1$-$302_3$. For example, each virtual space/organization may include tenant level objects 304B corresponding to respective tenants/tenant systems $302_1$-$302_3$ and separate instantiations of or access to blockchain services 304D. In this configuration/architecture, the virtual space/organization for each tenant system $302_1$-$302_3$ may perform one or more blockchain functions/operations on behalf of the corresponding tenant system $302_1$-$302_3$. For example, in response to receipt of a request from the tenant system $302_1$ to add/insert a new record to/into or modify/update an existing record of a physical object of the tenant system $302_1$, the multi-tenant server 304 may generate a shadow object record in the virtual space/organization of the tenant system $302_1$ within the multi-tenant server 304. In response, a transaction queue 304A may generate a transaction object corresponding to the record in the shadow object using the exchange object of the peer-to-peer blockchain network 308, such that the transaction object includes exchange fields with data from the shadow object, and a set of cryptographic keys of the tenant system $302_1$ such that the transaction object may be distributed or otherwise be made available to virtual spaces/organizations of the other tenant system $302_2$ and $302_3$.

In particular, the security service 312 of the blockchain services 304D may encrypt each exchange field of a transaction object based on permission/privilege levels of each tenant system 302. For example, the security service 312 may determine that the tenant system $302_1$ has read, update, and insert permissions/privileges for first and second exchange fields. In contrast, the tenant system $302_2$ may only have read permission for the first exchange field and read and update permissions for the second exchange field. Lastly, the tenant system $302_3$ may have no permissions/privileges in relation to the first exchange field and read, update, and insert privileges for the second exchange field. In this example situation, the security service 312 may generate a first set of keys for the tenant system $302_1$, a second set of keys for the tenant system $302_2$, and a third set of keys for the tenant system $302_3$ based on the private and public keys of the tenant system $302_1$-$302_3$ and the assigned permission/privilege levels. The first set of keys allow the tenant system $302_1$ to read, update, and insert data in relation to the first and second exchange fields; the second set of keys allow the tenant system $302_2$ to read the first exchange field and read and update the second exchange field; and the third set of keys allow the tenant system $302_3$ to read, update, and insert data in relation to the second exchange field. Accordingly, as described above and as will be described in greater detail below, the security service 312 of the multi-tenant server 304 provides permission/privilege level control of data in the blockchain network 308.

After distribution of the transaction object, the virtual spaces/organizations of the other tenant systems $302_2$ and $302_3$ may thereafter analyze the transaction object to determine whether validation/verification is appropriate. The transaction queue 304A may wait for validation/verification from the virtual spaces/organizations of the tenant systems $302_2$ and $302_3$ such that consensus for the proposed alteration to the physical object of the tenant system $302_1$ is achieved. In response to this consensus, a virtual space/organization of a leader tenant system $302_1$-$302_3$ may (1) add a record or modify a record (as appropriate) in a corresponding physical object and (2) add a corresponding entry/block to a distributed ledger of the leader tenant system $302_1$-$302_3$. Thereafter, the virtual space/organization of a leader tenant system $302_1$-$302_3$ may transmit a request to the virtual spaces/organizations of the other/remaining tenant systems $302_1$-$302_3$ to commit the change to their physical objects (based on a mapping defined in the exchange object) and/or add a corresponding entry/block to a ledger of these tenant systems $302_1$-$302_3$. As illustrated above and as will be described in greater detail below, the cloud environment provided by the multi-tenant server 304 (e.g., the virtual spaces/organizations provided by the multi-tenant server 304) may be used for managing blockchain transactions between the tenant systems $302_1$-$302_3$. In particular, the security service 312 encrypts exchange fields such that permissions/privileges (e.g., read, update, and insert permissions/privileges) may be enforced per peer/tenant system 302 and per exchange field.

In an embodiment, the interoperability network includes a mapper 314 that enables a mapping of data and/or metadata of one blockchain to the data and/or metadata of another blockchain. The mapper 314 can utilize mapping objects, exchange objects or similar data structures to map the fields of data and/or metadata between the physical object or transaction object of one blockchain to another blockchain. The mapper 314 can support mapping of blockchain objects between any number and variety of blockchain networks. The mappings can be declarative and input by administrators of the interoperability network, developers of any of the blockchain networks that participate in the interoperability, or similarly input by related user. The management of mappings can be limited by permissions to users of blockchains affected by the mappings, e.g., developers of blockchains into which a transaction object or similar blockchain object or data structure is being mapped.

Each element of the computing environment 300 of FIG. 3 will now be described in greater detail below by way of example. In some implementations, the computing environment 300 may include more elements than those shown in FIG. 1. Accordingly, the computing environment 300 of FIG. 3 is purely for illustrative purposes.

As shown in FIG. 3 and described above, the tenant systems $302_1$-$302_3$ and the multi-tenant server 304 may be connected through a set of one or more communication networks 306. The set of one or more communication networks 306 may be, for example, a local area network (LAN), a wide area network (WAN), a global area network (GAN), such as the Internet, or a combination of such networks. In another implementation, the tenant systems $302_1$-$302_3$ and the multi-tenant server 304 may maintain a direct connection to each other via a wired or wireless medium.

Each of the tenant systems $302_1$-$302_3$ may be a computing system that may be operated by one or more users. For example, each of the tenant systems $302_1$-$302_3$ may be a personal computer (PC), a workstation, a laptop computer, a tablet computer, a mobile phone, a smartphone, a personal digital assistant (PDA), or the like. As will be described in greater detail below, the tenant systems $302_1$-$302_3$ may communicate with the multi-tenant server 304 to modify/add/store and retrieve data.

The tenant systems $302_1$-$302_3$ (sometimes referred to as client, peer, or user systems) may each include a screen/display (e.g., a liquid crystal (LCD) display) for presenting an interface (e.g., a graphical user interface (GUI)) to a user, including an interface presented in a web page. As will be described in greater detail below, each of the tenant systems $302_1$-$302_3$ may include a corresponding transaction generator $110_1$-$110_3$ for receiving inputs from a user to alter a physical object associated with the tenant system $302_1$-$302_3$ (e.g., addition of a new record in the physical object or modification of an existing record in the physical object) and triggering the process of obtaining consensus (e.g., verification/validation) from the other tenant systems $302_1$-$302_3$ in the peer-to-peer blockchain network 308 for the alteration.

The tenant systems $302_1$-$302_3$ may each be associated with one or more organizations/tenants. For example, users of the tenant system $302_1$ may be customers of a first organization/tenant and a user of the tenant system $302_3$ may be a customer of a second organization/tenant. Organizations/tenants may be any firm, corporation, institution, association, or society that has contracted with an administrator of the multi-tenant server 304 to provide users access to data stored therein via the tenant systems $302_1$-$302_3$.

In one implementation, the multi-tenant server 304 may be any computing device that provides users access to resources via the tenant systems $302_1$-$302_3$ and the communication network(s) 306. For example, the multi-tenant server 304 may provide users of the tenant systems $302_1$-$302_3$ access to data in one or more physical objects and/or one or more corresponding distributed peer ledgers that describe changes to the physical objects. For example, a physical object of the tenant system $302_1$ may correspond to a medical lab report. In this example implementation, the records in the physical object may include a lab report identifier field, a patient name field, a lab network identifier field, a lab test identifier field, a patient identifier field, and a social security number field. When an alteration/change is desired to a physical object of a tenant system $302_1$-$302_3$ (e.g., addition of a new record to a physical object or modification of an existing record in a physical object), the multi-tenant server 304 uses the transaction queue 304A, the tenant level objects 304B, the network level objects 304C, and the blockchain services 304D to attempt to make these alterations in the peer-to-peer blockchain network 308 (e.g., alterations reflected in physical objects and distributed ledgers associated with the tenant systems $302_1$-$302_3$).

The multi-tenant server 304 may include various elements of hardware and software of a multi-tenant system. As used herein, the term "multi-tenant system" refers to those systems in which various elements of hardware and software may be shared by one or more tenants. For example, the multi-tenant server 304 may simultaneously process requests for a great number of tenants, and a given database table may store records for a potentially much greater number of tenants. The multi-tenant server 304 may include an application platform including a framework (e.g., services and metadata) that allows applications to execute, such as the hardware or software infrastructure of the system. In one implementation, the multi-tenant server 304 includes separate virtual spaces/organizations (sometimes referred to as portions or partitions) for data/objects as well as services of each tenant system $302_1$-$302_3$. For example, each tenant system $302_1$-$302_3$ may be assigned a separate virtual space/organization. Each virtual space/organization is a logical partition within the multi-tenant server 304 and includes separate tenant level objects 304B that are only accessible to that tenant system $302_1$-$302_3$ and are inaccessible to other tenant systems $302_1$-$302_3$ (e.g., tenant systems $302_1$-$302_3$ cannot read and/or write tenant level objects 304B of another tenant system $302_1$-$302_3$) in addition to services used by the multi-tenant server 304 on behalf of the corresponding tenant system $302_1$-$302_3$ (e.g., blockchain services 304D).

As shown in FIG. 3, the peer-to-peer blockchain network 308 may include the tenant systems $302_1$-$302_3$, which each represent tenants/peers. The peer-to-peer blockchain network 308 shown in FIG. 3 is a representation of peers/tenants within the blockchain network 308. In some embodiments, the peer-to-peer blockchain network 308 may be viewed as a distributed network that is controlled by the multi-tenant server 304 with inputs/requests from the tenant systems $302_1$-$302_3$. As described above and as will be described in greater detail below, the multi-tenant server 304 may perform various functions/operations on behalf of the tenant systems $302_1$-$302_3$. For example, the multi-tenant server 304 may perform blockchain functions/operations on behalf on the tenant systems $302_1$-$302_3$ using the blockchain services 304D. As noted above, in some implementations, the blockchain functions/operations may be performed in separate virtual spaces/organizations associated with respective tenant systems $302_1$-$302_3$.

Although shown with three tenants/peers (e.g., the tenant systems $302_1$-$302_3$), in other implementations, the peer-to-peer blockchain network 308 may include more or fewer tenants/peers. For example, the peer-to-peer blockchain network 308 may include two, four, five, or more tenants/peers with corresponding tenant systems 302. Accordingly, the use of three tenants/peers is for illustrative purposes.

Figure 4A:
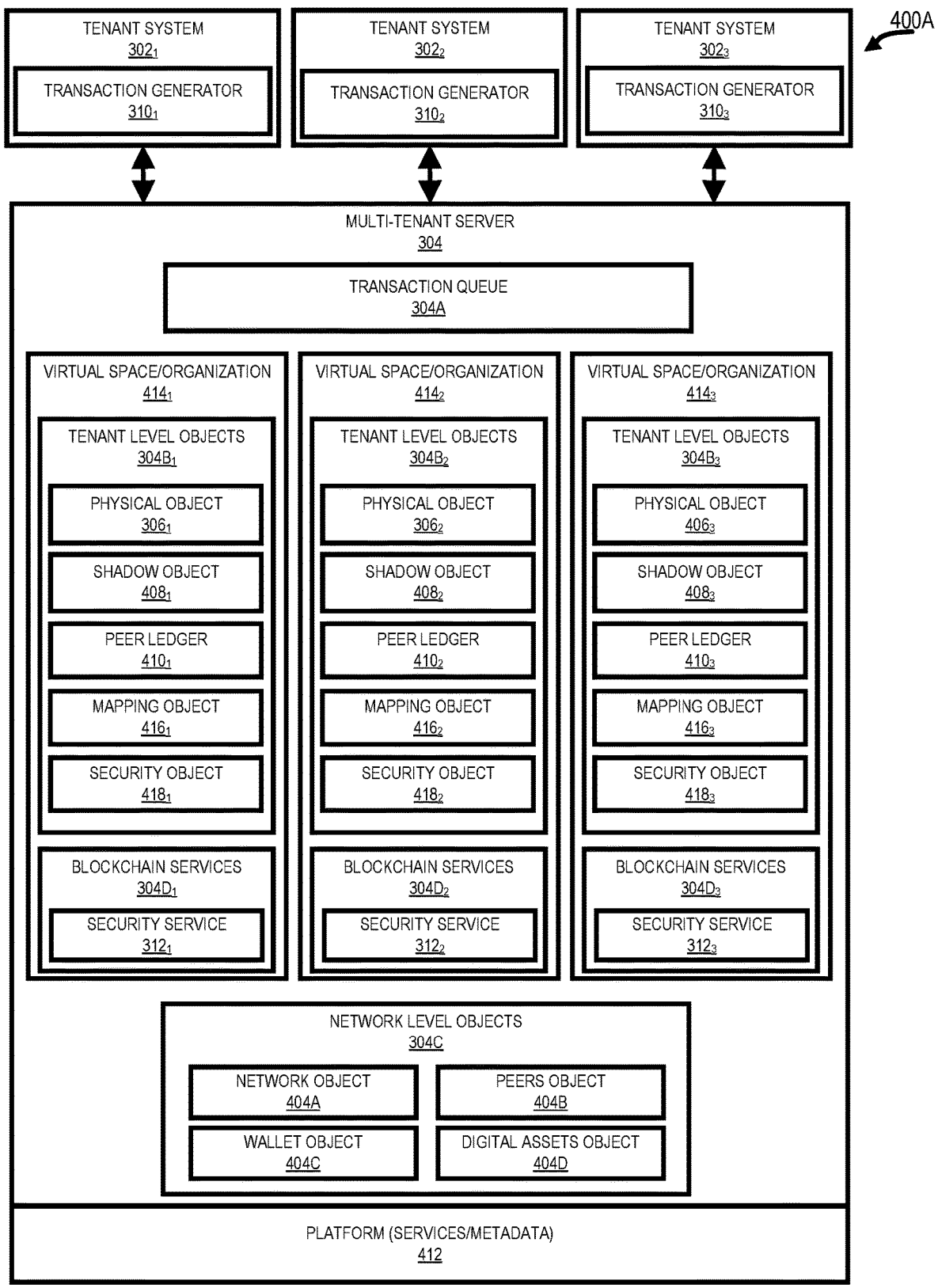
FIG. 4A shows the computing environment, including a set of separate blockchain services per tenant system, according to one example implementation.
Figure 4B:
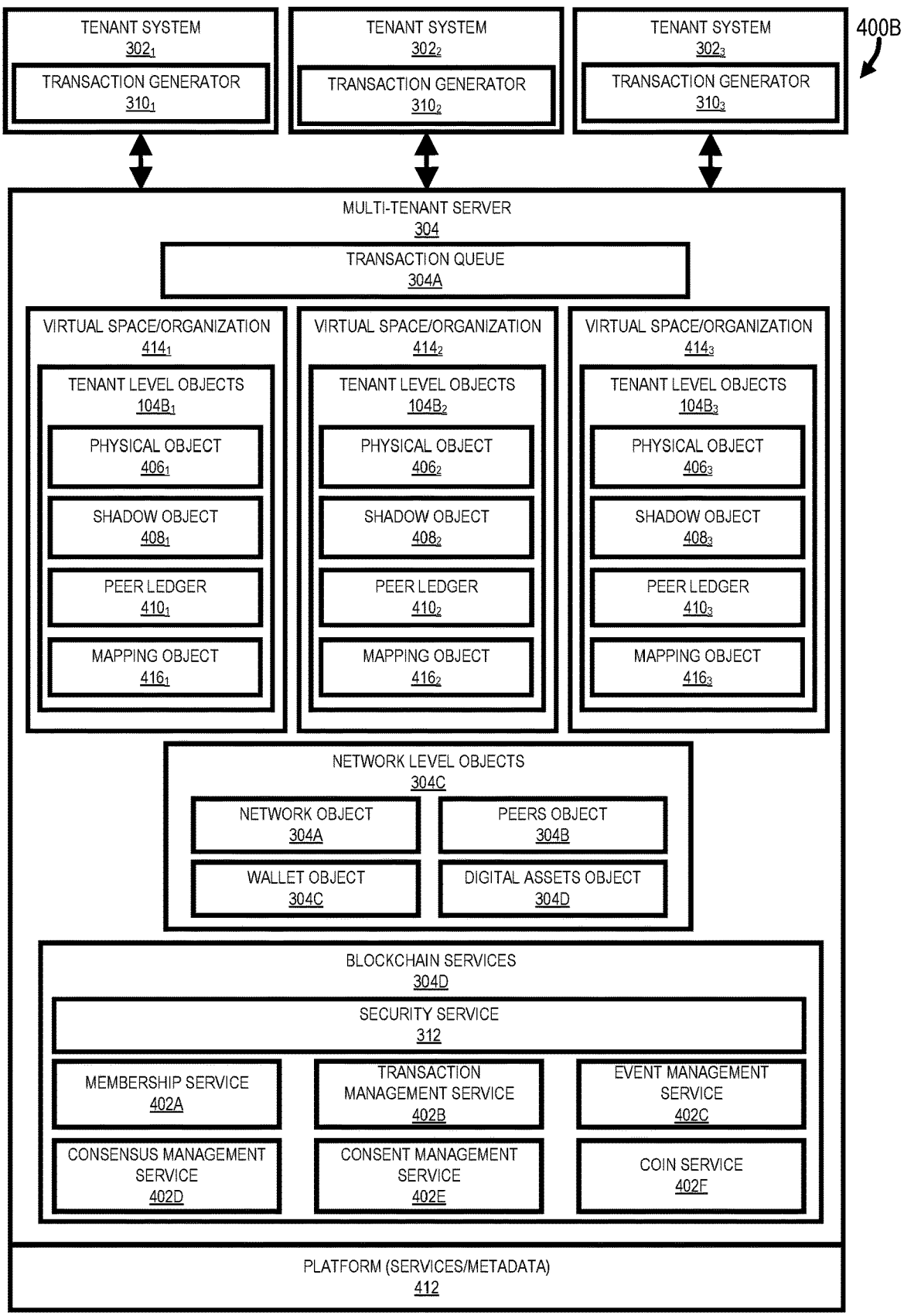
FIG. 4B shows the computing environment, including a set of shared blockchain services, according to another example implementation.

FIG. 4A is a diagram of one embodiment of a multi-tenant server. In the multi-tenant server, each tenant system $302_1$-$302_3$ may be associated with a separate virtual space/organization $414_1$-$414_3$ with corresponding tenant level objects $304B_1$-$304B_3$ (e.g., physical objects $406_1$-$406_3$, shadow objects $408_1$-$408_3$, peer ledgers $410_1$-$410_3$, and mapping objects $416_1$-$416_3$) and blockchain services $304D_1$-$304D_3$. Although shown in FIG. 4A as separate instantiations of the blockchain services $304D_1$-$304D_3$ for each virtual space/organization $414_1$-$414_3$, each virtual space/organization $414_1$-$414_3$ may instead have separate access to a single instantiation of the blockchain services 304D as shown in FIG. 4B.

The membership service 402A may generate a set of public keys (PKs) and private/secret keys (SKs) for each tenant/tenant system $302_1$-$302_3$ in the peer-to-peer blockchain network 308. In one implementation, the public keys are generated based on a determined private key. For example, a one-way cryptographic hash function (e.g., SHA256) may be used to generate public keys for the tenant systems $302_1$-$302_3$ based on corresponding private keys. In one implementation, the public keys and the private/secret keys may be stored by the membership service 402A in the wallet object 404C following generation. As will be described in greater detail below, the transaction queue 304A may utilize the private/secret keys stored in the wallet object 404C for generating transaction objects and sets of permission keys for each of the tenant systems $302_1$-$302_3$. In particular, the public keys and private/secret keys may be used by the transaction queue 304A for implementing cryptographic elements of transactions used by the peer-to-peer blockchain network 308 and the security service 312 may use the permission keys for enforcing permission/privileges of tenant systems $302_1$-$302_3$.

Figure 5:
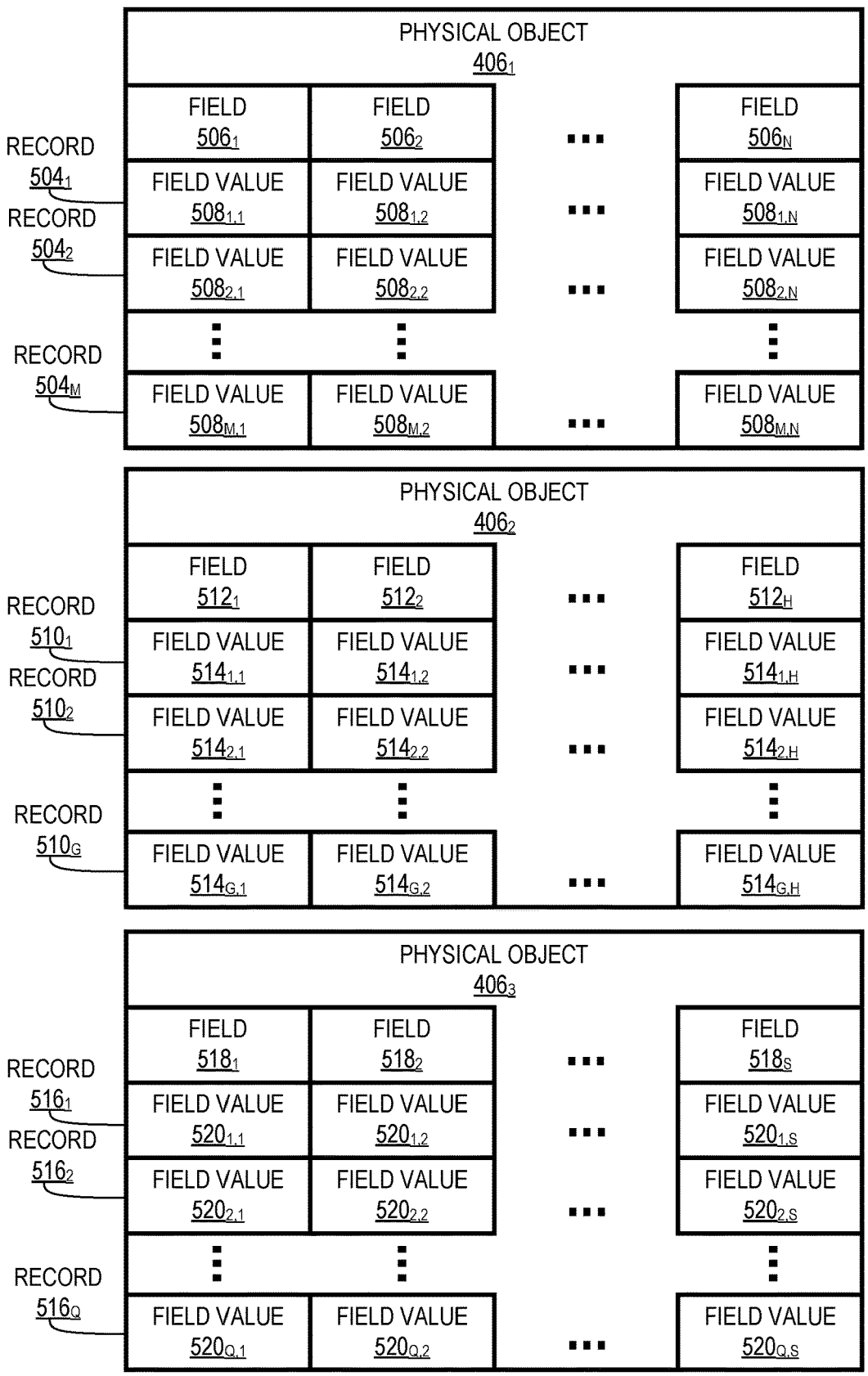
FIG. 5 shows physical objects corresponding to a set of tenant systems, according to one example implementation.

The membership service 402A may determine an exchange object for the peer-to-peer blockchain network 308. In one implementation, the exchange object is defined by a set of exchange fields and mapping metadata that defines mappings between each exchange field and fields in physical objects of the tenant systems $302_1$-$302_3$. For example, FIG. 5 shows physical objects $406_1$-$406_3$ for the tenant systems $302_1$-$302_3$, respectively. In this example, the physical object $406_1$, corresponding to the tenant system $302_1$, includes records $504_1$-$504_M$, which are composed of fields $506_1$-$506_N$, and each record $504_1$-$504_M$ includes values $508_{1,1\text{-}M,N}$ for each field $506_1$-$506_N$. Similarly, the physical object $406_2$, corresponding to the tenant system $302_2$, includes records $510_1$-$510_G$, which are composed of fields $512_1$-$512_H$, and each record $510_1$-$510_G$ includes values $514_{1,1\text{-}G,H}$ for each field $512_1$-$512_H$. Likewise, the physical object $406_3$, corresponding to the tenant system $302_3$, includes records $516_1$-$516_Q$, which are composed of fields $518_1$-$518_S$, and each record $516_1$-$516_Q$ includes values $520_{1,1\text{-}Q,S}$ for each field $518_1$-$518_S$. Each of the physical objects $406_1$-$406_3$ may represent any type of data. For example, the tenant system $302_1$ may operate in or otherwise correspond to a medical laboratory. In this example, the physical object $406_1$ may represent medical lab reports (e.g., each of the records $504_1$-$504_M$ may correspond to separate medical lab reports). The tenant system $302_2$ may operate in or otherwise correspond to a doctor's office. In this example, the physical object $406_2$ may represent a patient file (e.g., each of the records $510_1$-$510_G$ may correspond to separate patient files).

Figure 6:
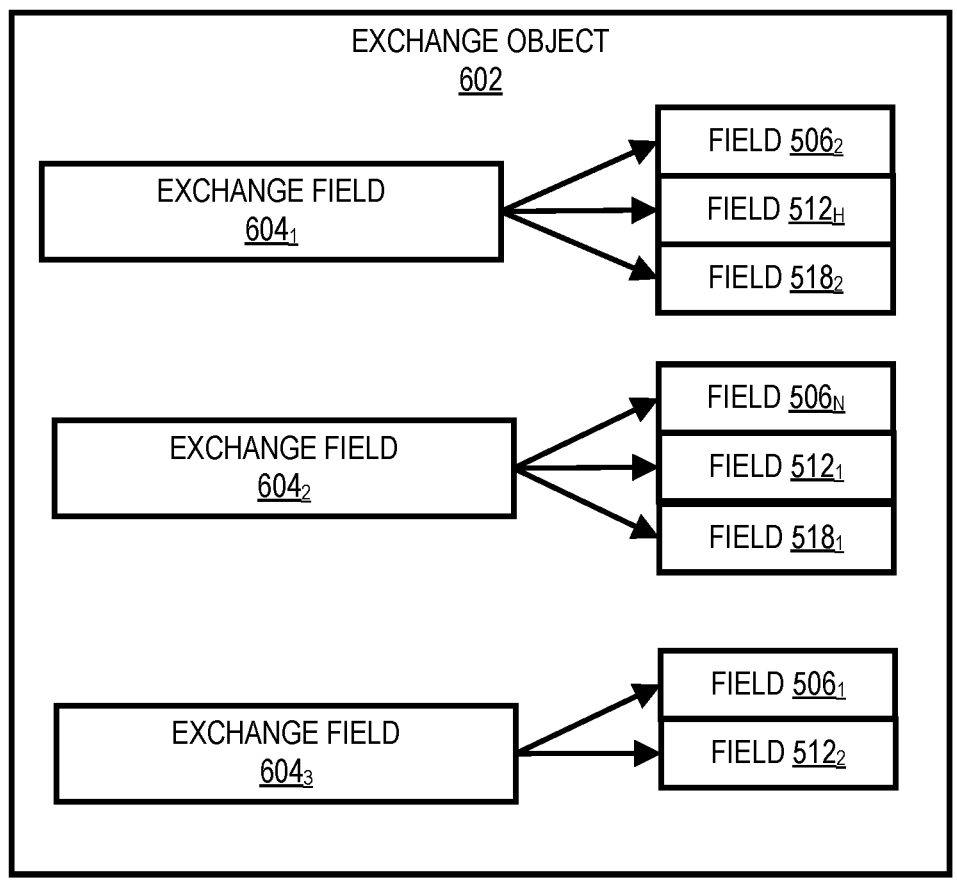
FIG. 6 shows an exchange object, including a set of mappings between exchange fields and fields of physical objects, according to one example implementation.

For the example physical objects $406_1$-$406_3$ shown in FIG. 5, the membership service 402A may determine an exchange object 602 as shown in FIG. 6, which may be stored in the digital assets object 504D. As shown in FIG. 6, the exchange object 602 is defined by the exchange fields $604_1$-$604_3$ and the mapping metadata that maps exchange fields 604 to fields of physical objects 406. In this configuration, the exchange field $604_1$ maps to the field $506_2$ of the physical object $406_1$, the field $512_H$ of the physical object $406_2$, and the field $518_2$ of the physical object $406_3$. The exchange field $604_2$ maps to the field $506_N$ of the physical object $406_1$ and the field $512_1$ of the physical object $406_2$, and the field $518_1$ of the physical object $406_3$. The exchange field $604_4$ maps to the field $506_1$ of the physical object $406_1$ and the field $512_2$ of the physical object $406_2$. Accordingly, the mapping metadata of the exchange object 602 maps/links exchange fields 604 to fields of physical objects 406. In some implementations, the number of exchange fields $604_1$-$604_3$ (i.e., three) is less than (1) the number of fields $506_1$-$506_N$ in the physical object $406_1$ (i.e., N), (2) the number of fields $512_1$-$52_H$ in the physical object $406_2$ (i.e., H), and/or (3) the number of fields $518_1$-$518_S$ in the physical object $406_3$ (i.e., S). Accordingly, a generated transaction object, which will be distributed amongst the tenant systems $302_1$-$302_3$, and corresponding data/information included in distributed peer ledgers 410 may not include sensitive data.

The mapping of exchange fields 604 to fields 506, 512, and 518 of physical objects $406_1$-$406_3$ indicates a relationship between the fields 506, 512, and 518 of physical objects $406_1$-$406_3$. For instance, using the example above in which the physical object $406_1$ represents medical lab reports and the physical object $406_2$ represents patient files, the field $506_2$ of the physical object $406_1$ may correspond to a patient identifier for which a corresponding medical lab report was generated and the field $512_H$ of the physical object $406_2$ may correspond to a patient identifier for which a corresponding patient file represents. As shown in FIG. 6 and described above, these fields $506_2$ and $512_H$ are mapped to the same exchange field $604_1$, indicating that these fields $506_2$ and $512_H$ represent similar data (e.g., the fields $506_2$ and $512_H$ both represent patient identifiers).

In some implementations, each tenant/tenant system $302_1$-$302_3$ may be part of multiple blockchain networks, including the blockchain network 308. Each of these blockchain networks may include overlapping membership with the blockchain network 308 and/or may include additional peers/tenant systems 302. In some implementations, the network object 404A may include identifiers for each blockchain network managed by the multi-tenant server 304, the peers object 404B may include identifiers for each peer/tenant system 302 in the blockchain networks managed by the multi-tenant server 304, the wallet object 404C may include keys for each peer/tenant system 302 in the blockchain networks managed by the multi-tenant server 304, and the digital assets object 404D may include exchange objects 602 for each blockchain network managed by the multi-tenant server 304. In some implementations, the tenant level objects 304B for each tenant system 302 may include a mapping object 416. Each mapping object 416 includes the mapping metadata for the corresponding tenant system 302. For example, the mapping object $416_1$, which corresponds to the tenant system $302_1$, includes mapping metadata that maps exchange field $604_1$ to field $506_2$ of the physical object $406_1$; exchange field $604_2$ to field $506_N$ of the physical object $406_1$; and exchange field $604_3$ to field $506_1$ of the physical object $406_1$. In contrast, the mapping object $416_2$, which corresponds to the tenant system $302_2$, includes mapping metadata that maps exchange field $604_1$ to field $512_H$ of the physical object $406_2$; exchange field $604_2$ to field $512_1$ of the physical object $406_2$; and exchange field $604_3$ to field $512_2$ of the physical object $406_2$. Lastly, the mapping object $416_3$, which corresponds to the tenant system $302_3$, includes mapping metadata that maps exchange field $604_1$ to field $518_2$ of the physical object $406_3$ and exchange field $604_2$ to field $518_1$ of the physical object $406_3$. Accordingly, each mapping object 416 only includes mapping metadata associated with a corresponding tenant system 302.

The security service 312 may determine permissions/privileges (sometimes referred to as permission/privilege levels) per each exchange field 604 and tenant system 302. For example, the blockchain network 308 may offer read, update, and insert privileges per each exchange field 604. In this example, the security service 312 may determine that the tenant system $302_1$ has read, update, and insert permissions for the exchange fields $604_1$-$604_3$. In contrast, the tenant system $302_2$ may only have read permission for the exchange field $604_1$ and read and update permissions for the exchange fields $604_2$ and $604_3$. Lastly, the tenant system $302_3$ may have no permissions/privileges in relation to the exchange field $604_1$ and read, update, and insert privileges for the exchange fields $604_2$ and $604_3$. The determination of privileges/permissions may be based on an indication from an administrator or a subscription level of the tenant systems 302.

Figure 7:
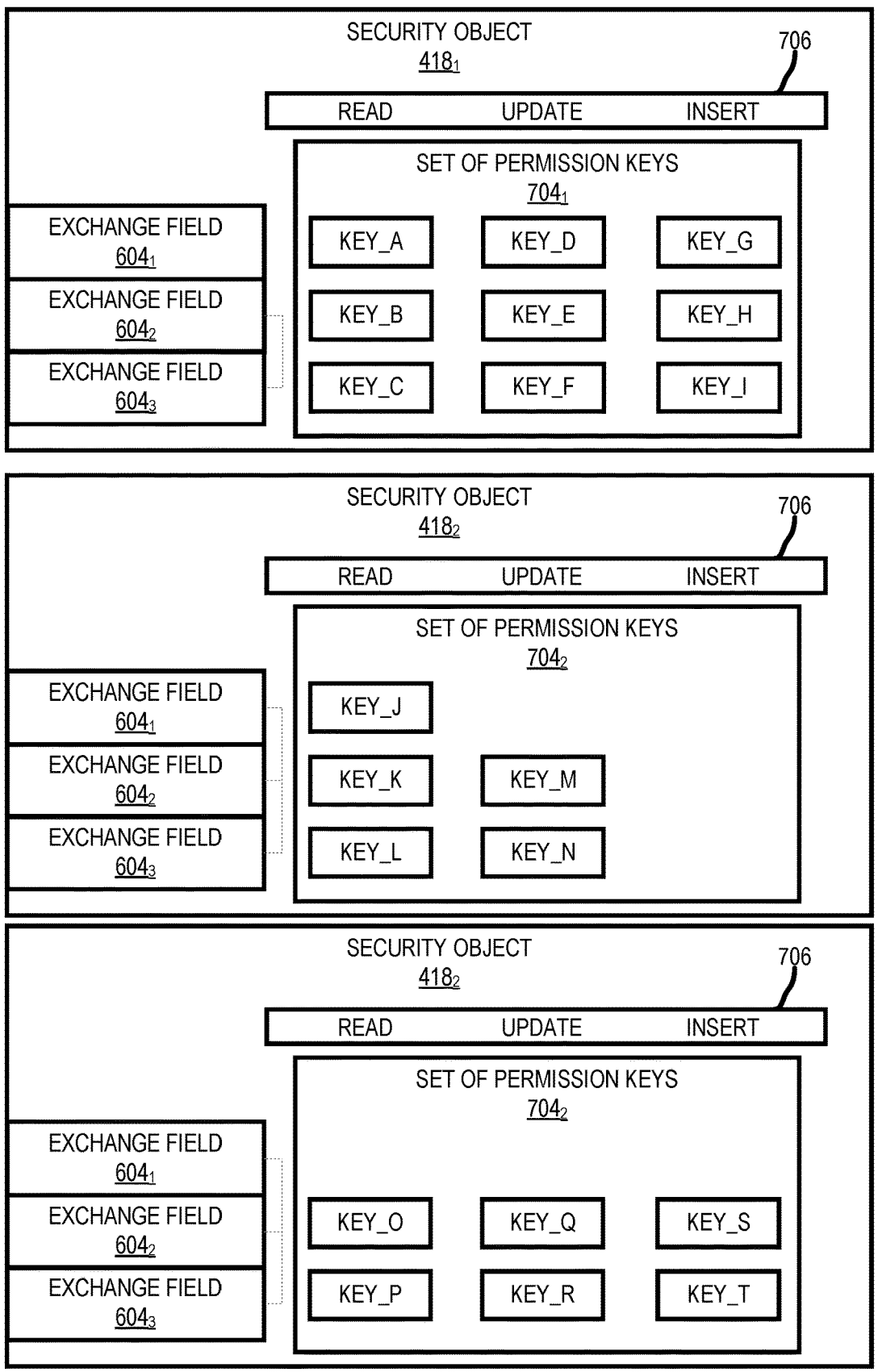
FIG. 7 shows security objects for each of the tenant systems, according to one example implementation.

The security service 312 may generate a set of permissions keys for each tenant system 302. The sets of permissions keys may be used by or on behalf of the tenant systems 302 for accessing one or more exchange fields 604. For example, each set of permission keys may include a separate key for each exchange field 604 and each permission/privilege level of a tenant system 302. For example, FIG. 7 shows security objects $418_1$-$418_3$ for each of the tenant systems $302_1$-$302_3$, respectively. As shown, sets of keys $704_1$-$704_3$ are provided per exchange field 604 for each permission/privilege level 706 associated with a corresponding tenant system 302. These sets of keys $704_1$-$704_3$ may be generated based on one or more of the public and private keys of each respective tenant system 302 and may be used for reading, updating, and inserting exchange fields 604 into the blockchain network 308 via corresponding transaction objects and peer ledgers 410.

The transaction management service 402B of the blockchain services 304D may receive (1) a proposed new record to add to a physical object $406_1$-$406_3$ or (2) a modification to an existing record of a physical object $406_1$-$406_3$. For instance, as described in the above example, the physical object $406_1$ may correspond to medical lab reports and the transaction management service 402B of the virtual space/organization $414_1$ may receive a request to add/insert a new lab report record 504 from the tenant system $302_1$. In another example, again the physical object $406_1$ may correspond to medical lab reports and the transaction management service 402B of the virtual space/organization $414_1$ may receive a request to modify an existing lab report record 504 from the tenant system $302_1$.

The security service 312 may determine if the tenant system $302_1$ has adequate permissions/privileges to perform a received request (e.g., the security service 312 determines whether the tenant system $302_1$ is authorized to add/insert a new lab report record 504). In one implementation, this determination is based on the security object $418_1$, which includes keys for each permission/privilege level 706 of the tenant system $302_1$. In particular, in response to failing to locate a permission key for each exchange field 604 requested to be inserted and corresponding to the insert permission/privilege 706, the security service 312 may determine that the tenant system $302_1$ does not have adequate permissions/privileges to perform the received request may move to reject the request.

In contrast, in response to locating a permission key for each exchange field 604 requested to be inserted and corresponding to the insert permission/privilege 706, the security service 312 may determine that the tenant system $302_1$ has adequate permissions/privileges to perform the received request.

The transaction management service 402B of the virtual space/organization $414_1$ generates a record in a shadow object $408_1$ corresponding to the received request (i.e., the new record). The shadow object $408_1$ may correspond to the tenant system $302_1$ and may include all the fields $506_1$-$506_N$ of the physical object $406_1$. In contrast to the physical object $406_1$, which stores committed data that is also represented in a corresponding peer ledger $410_1$ of the tenant system $302_1$ (e.g., additions/modifications to records 504 of the physical object $406_1$ of the tenant system $302_1$), the shadow object $408_1$ represents un-committed data to the physical object $406_1$. As will be described in greater detail below, the data in the shadow object $408_1$ of the tenant system $302_1$ needs to be validated/verified through consensus by the other tenant systems $302_2$ and $302_3$ before being committed to the physical object $406_1$ and represented by the peer ledger $410_1$ of the tenant system $302_1$. This committal and representation may also extend to the physical objects $406_2$ and $406_3$ and peer ledgers $410_2$ and $410_3$ of the tenant systems $302_2$ and $302_3$ as will be described in greater detail below.

Figure 8:
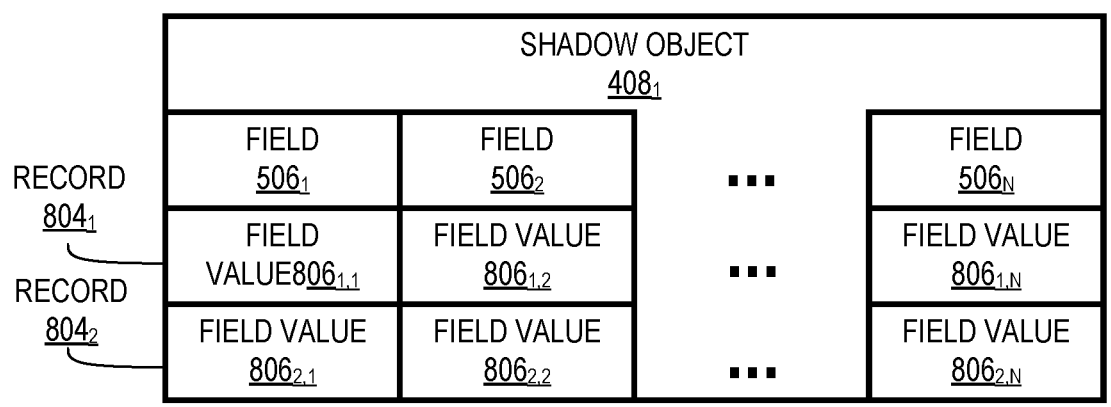
FIG. 8 shows an example of a shadow object corresponding to a tenant system, according to one example implementation.

FIG. 8 shows an example of a shadow object $408_1$ corresponding to the tenant system $302_1$ and the physical object $406_1$, according to one example implementation. As shown, the shadow object $408_1$ includes two records $804_1$ and $804_2$, corresponding to two separate proposed alterations to the physical object $406_1$. For example, the first record $804_1$ corresponds to the addition/insertion of a record 504 in the physical object $406_1$ and the second record $804_2$ corresponds to the modification/update of one or more field values 508 for the newly added/inserted record 504 in the physical object $406_1$. For instance, the first record $804_1$ may propose the addition/insertion of a record 504 corresponding to a medical lab report, while the second record $804_2$ may propose the modification of several fields' values 508 of the new medical lab report record 504 (e.g., modification/update of a field value 508 corresponding to the status of the medical lab report).

The event management service 402C and/or the transaction queue 304A may generate a transaction object based on (1) the record $804_1$ added to the shadow object $408_1$ and (2) the exchange object 602 of the peer-to-peer blockchain network 308. In particular, the transaction object may include values for each of the exchange fields $604_1$-$604_3$ and data/field values from the record $804_1$ added to the shadow object $408_1$ in corresponding exchange fields $604_1$-$604_3$. For example, FIG. 9 shows an example of a transaction object 902, according to one example implementation.

As shown in FIG. 9, the transaction object 902 includes all the exchange fields $604_1$-$604_3$ of the exchange object 602 and field values 806 from the record $804_1$ in the shadow object $408_1$ in the appropriate positions based on the mapping between exchange fields $604_1$-$604_3$ and fields 506 of the physical object $406_1$. Although shown in relation to the record $804_1$, a separate transaction object 902 may be generated for the record $804_2$. As will be described below, the transaction object 902, which will be used hereinafter for purposes of illustration, may be passed or otherwise made available to the other tenant systems $302_2$ and $302_3$ to determine if there is consensus in the blockchain network 308 to commit the proposed record 504 (e.g., to verify/validate the transaction object 902).

In one implementation, generation of the transaction object 902 may include adding a signature to the transaction object based on (1) the record $804_1$ from the shadow object $408_1$, (2) a unique assigned identifier of the transaction object 902 (e.g., an identifier assigned sequentially to transaction objects 902 as they are generated), and (3) the private key of the tenant system $302_1$ (i.e., the private key of the tenant system 302 proposing the alteration). For example, the record $804_1$ and the unique assigned identifier of the transaction object 902 may be merged or otherwise combined together to form a single message and the private key of the tenant system $302_1$ may be used to encrypt the message (e.g., using a one-way cryptographic hash function, such as SHA256) to form a digital signature. Accordingly, the transaction object 902 includes the record $804_1$ from the shadow object $408_1$ along with the signature generated using the private key of the tenant system $302_1$.

In some implementations, the security service 312 may separately encrypt each exchange field 604 of the transaction object 902 using (1) the private key of the tenant system $302_1$ (i.e., the private key of the tenant system 302 proposing the alteration); (2) a permission key of each tenant system 302 that has a permission/privilege 706 related to the exchange field 604 (i.e., permission keys of tenant systems 302 that have read, update, and/or insert privileges associated with the exchange fields 604); and/or (3) a public key of each tenant system 302 that has a permission/privilege related to the exchange field 604. In these implementations, using permission keys of each tenant system 302 that has a permission/privilege related to the exchange field 604 ensures that only these tenant systems 302 have access (e.g., read access) to corresponding exchange fields 604. In some implementations, private keys, public keys, and/or permission keys may be used along with a cryptographic function (e.g., SHA256) to generate encrypted data.

Returning to FIG. 4A, the event management service 402C and the transaction queue 304A may make the transaction object 902 available to the other tenant systems $302_2$ and $302_3$. In some implementations, making the transaction object 902 available to the other tenant systems $302_2$ and $302_3$ includes the transaction queue 304A placing the transaction object 902 in a portion/partition of the multi-tenant server 304 accessible to the tenant systems $302_2$ and $302_3$. For example, as described above, the multi-tenant server 304 may include a separate virtual space/organization 414 for each of the tenant systems $302_1$-$302_3$. Each virtual space/organization 414 includes data and services that are only accessible to that tenant system $302_1$-$302_3$ and is inaccessible to other tenant systems $302_1$-$302_3$. The multi-tenant server 304 may pass the transaction object 902 from the virtual space/organization $414_1$ of the tenant system $302_1$ to the virtual spaces/organizations $414_2$ and $414_3$ of the tenant systems $302_2$ and $302_3$ such that the virtual spaces/organizations $414_2$ and $414_3$ of the tenant systems $302_2$ and $302_3$ can process/analyze the transaction object 902 for possible validation/verification. As noted above, since exchange fields 604 may be encrypted using private keys, public keys, and/or permission keys, only those tenant systems 302 with read access to an exchange field 604 may be able to determine the contents of that exchange field 604.

The transaction management service 402B may monitor responses from the tenant systems $302_2$ and $302_3$ to determine if consensus has been reached regarding the transaction object 902 or if consensus has failed to be reached. In one implementation, the consensus management service 402D may define the threshold or rules for use by the transaction management service 402B in determining when consensus has been reached by the tenant systems $302_2$ and $302_3$ regarding the transaction object 902. For example, in some implementations, the consensus management service 402D may indicate that consensus requires all of the tenant systems $302_2$ and $302_3$ to verify/validate the transaction object 902, while in other implementations, the consensus management service 402D may indicate that consensus requires a majority of the tenant systems $302_2$ and $302_3$ to verify/validate the transaction object 902. In some implementations, the consent management service 402E indicates the rules and/or operations used by the tenant systems $302_2$ and $302_3$, and in particular the virtual spaces/organizations $414_2$ and $414_3$ associated with the tenant systems $302_2$ and $302_3$, to determine if verification/validation of the transaction object 902 is proper. For example, the consent management service 402E may indicate that the public key of the tenant system $302_1$ is used along with the signature and message in the transaction object 902 for determining whether the transaction object 902 originated from and was authorized by the tenant system $302_1$.

The transaction management service 402B and the transaction queue 304A may discard the transaction object 902 in response to failing to obtain consensus from the tenant systems $302_2$ and $302_3$ (e.g., failing to obtain consensus as defined/indicated by the consensus management service 402D). In some implementations, discarding the transaction object 902 may include indicating to the tenant system $302_1$ that the transaction object 902 and corresponding alteration to the physical object $406_1$ (i.e., addition of a new record 504 to the physical object $406_1$ or modification of an existing record 504 to the physical object $406_1$) has been rejected by the peer-to-peer blockchain network 308 (i.e., consensus in the peer-to-peer blockchain network 308 was not achieved/obtained). In response to receipt of notification that the transaction object 902 and corresponding alteration to the physical object has been rejected by the peer-to-peer blockchain network 308, the virtual space/organization 441 may delete the record $804_1$ in the shadow object $408_1$ corresponding to the transaction object 902.

The transaction management service 402B may commit the transaction object 902 and/or the record $804_1$ in the shadow object $408_1$ corresponding to the transaction object 902 for which consensus was achieved on behalf of a leader tenant system $302_1$-$302_3$. In some implementations, a leader tenant system $302_1$-$302_3$ may be randomly selected from amongst the tenant systems $302_1$-$302_3$ in the peer-to-peer blockchain network 308 by the membership service 402A. When the leader tenant system $302_1$-$302_3$ is the tenant system $302_1$ (i.e., the tenant system $302_1$-$302_3$ that instigated or was otherwise associated with the alteration to the physical object $406_1$), the transaction management service 402B in the virtual space/organization $414_1$ of the tenant system $302_1$ may commit the record $804_1$ in the shadow object $408_1$, which corresponds to the transaction object 902 for which consensus was achieved, on behalf of the tenant system $302_1$. In this situation, committal may include adding the record $804_1$ from the shadow object $408_1$ to the physical object $406_1$. When the leader tenant system $302_1$-$302_3$ is the tenant system $302_2$ or the tenant system $302_3$, the transaction management service 402B in the corresponding virtual space/organization $414_2$ and $414_3$ of the tenant systems $302_2$ and $302_3$ may commit the transaction object 902 that consensus was achieved on behalf of the tenant system $302_2$/$302_3$. In this situation, committal may include adding a record 510/516 to or modifying a record 510/516 in the physical object $406_2$/$406_3$ that includes the field values 806 from the shadow object $408_1$ mapped to corresponding fields 512/518 in the physical objects $406_2$/$406_3$ as indicated by the exchange object 602 or corresponding mapping object 416.

Figure 10:
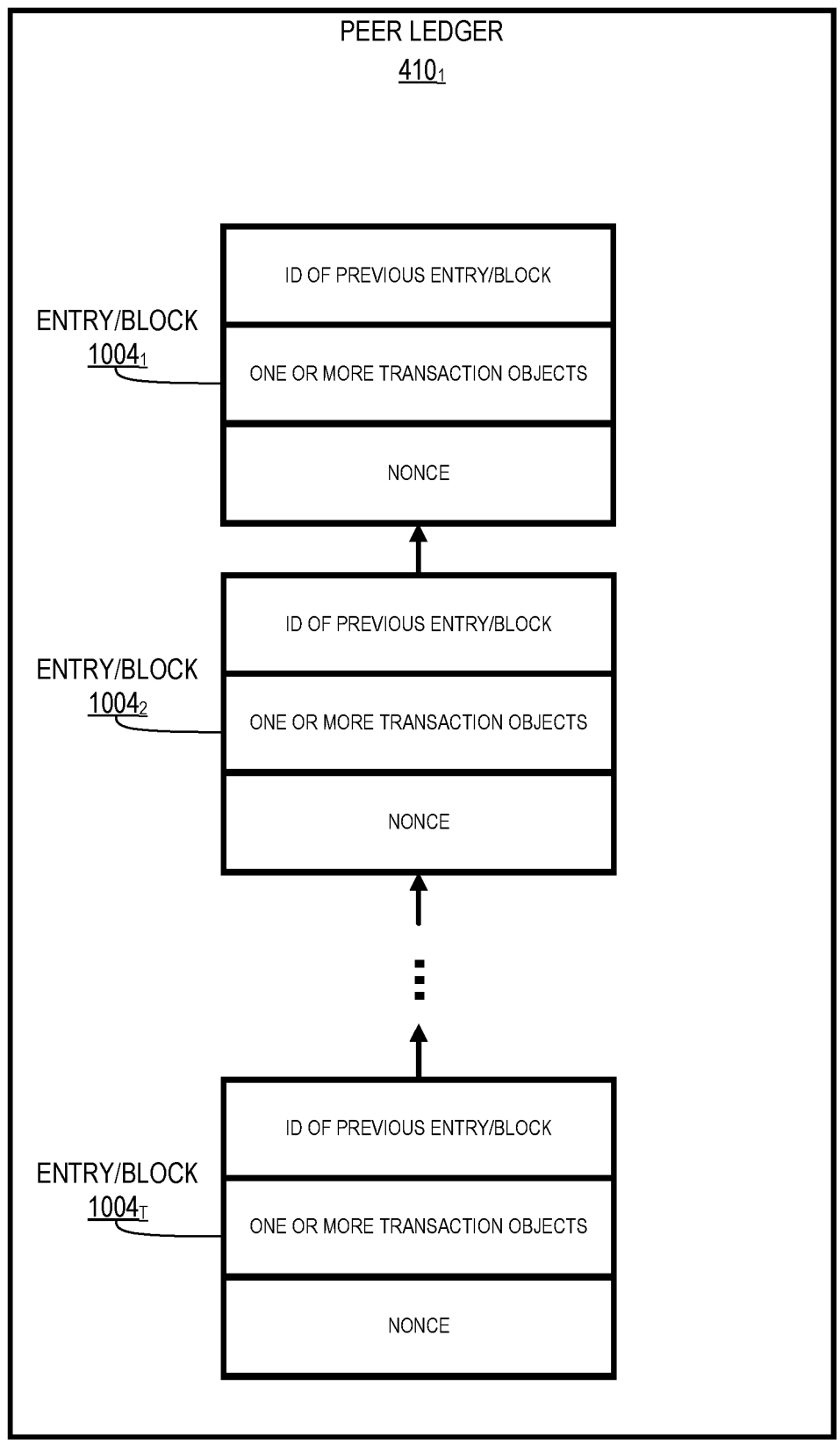
FIG. 10 shows an example of a blockchain, including a set of entries/blocks, according to one example implementation.

The transaction management service 402B may add an entry/block in the peer ledger $410_1$-$410_3$ corresponding to the transaction object 902 on behalf the leader tenant system $302_1$-$302_3$. In particular, the transaction management service 402B of the virtual space/organization $414_1$-$414_3$ of the leader tenant system $302_1$-$302_3$ may add an entry/block in the peer ledger $410_1$-$410_3$ corresponding to the transaction object 902 on behalf the leader tenant system $302_1$-$302_3$. The entry/block added to the peer ledger $410_1$-$410_3$ may include several pieces of information. For example, as shown in FIG. 10, each entry/block $1004_1$-$1004_T$ in the peer ledger $410_1$ may include a reference to the previous entry/block 1004 in the peer ledger $410_1$, the transaction object 902 (along with one or more other transaction objects), and a nonce (i.e., an arbitrary number used to meet a requirement of the peer-to-peer blockchain network 308).

Returning to FIG. 4A, the transaction management service 402B and/or the transaction queue 304A may transmit a request or otherwise trigger the other tenant systems $302_1$-$302_3$ on behalf of the leader tenant system $302_1$-$302_3$ to commit the transaction object 902 to corresponding physical objects $406_1$-$406_3$ and add a block/entry to corresponding peer ledgers $410_1$-$410_3$. In particular, the transaction management service 402B of the virtual space/organization $414_1$-$414_3$ of the leader tenant system $302_1$-$302_3$ passes or otherwise makes available a request or otherwise triggers the transaction management service 402B of the virtual spaces/organizations $414_1$-$414_3$ of the other tenant systems $302_1$-$302_3$ to commit the transaction object 902 to corresponding physical objects $406_1$-$406_3$ and add a block/entry to corresponding peer ledgers $410_1$-$410_3$. The peer ledgers $410_1$-$410_3$ allow the computing environments 300, 400A, and/or 400B to maintain the transparency and auditability of data. In particular, the multi-tenant server 304 provides immutability to each transaction by recording/reflecting the transaction in the peer ledgers $410_1$-$410_3$, which are replicated across all the tenant systems $302_1$-$302_3$. As described above, the tenant systems $302_1$-$302_3$ participate in a consensus mechanism to verify/validate transactions/transaction objects 902 and only after the transactions/transaction objects 902 are verified/validated will the transactions/transaction objects 902 be committed to the peer ledgers $410_1$-$410_3$. In some implementations, the peer ledgers $410_1$-$410_3$ may be stored in a Merkle directed acyclic graph (DAG) structure. The Merkle DAG may be represented in an Oracle and/or HBase store. In conjunction with, after, or upon data being committed to the peer ledgers $410_1$-$410_3$, relevant physical objects $406_1$-$406_3$ will be updated with the most recent data in the peer ledgers $410_1$-$410_3$. In some implementations, the peer ledgers $410_1$-$410_3$ may also hold data describing the tenants/tenant systems $302_1$-$302_3$ that can view data or otherwise operate in the peer-to-peer blockchain network 308.

One or more tenant systems 302 may attempt to read one or more exchange fields 604 in a corresponding peer ledger 410. For example, the transaction object 902 that was added to the peer ledgers $410_1$-$410_3$ of the tenant systems $302_1$-$302_3$ in the example above included the exchange fields $604_1$-$604_3$. As indicated above, each of the tenant systems $302_1$ $302_3$ have assigned permission/privilege levels, which are indicated in corresponding security objects $418_1$-$418_3$. Accordingly, permission/privilege levels of tenant systems $302_1$-$302_3$ in relation to exchange fields 604 are independent. For example, the virtual space/organization $414_1$ of the tenant system $302_1$ may attempt to read the exchange field $604_1$ of a transaction object 902 stored in the peer ledger $410_1$. Since the security object $418_1$ of the tenant system $302_1$ includes a permission key for reading the exchange field $604_1$ (i.e., KEY_A), the virtual space/organization $414_1$ of the tenant system $302_1$ will be able to successfully to decode the value in the exchange field $604_1$ for the transaction object 902 stored in the peer ledger $410_1$ based on this permission key (i.e., KEY_A). Similarly, since the security object $418_2$ of the tenant system $302_2$ includes a permission key for reading the exchange field $604_1$ (i.e., KEY_J), the virtual space/organization $414_2$ of the tenant system $302_2$ will be able to successfully to decode the value in the exchange field $604_1$ for the transaction object 902 stored in the peer ledger 402 based on this permission key (i.e., KEY_J). However, since the security object $418_3$ of the tenant system $302_3$ does not include a permission key for reading the exchange field $604_1$, the virtual space/organization $414_3$ of the tenant system $302_3$ will not be able to successfully to decode the value in the exchange field $604_1$ for the transaction object 902 stored in the peer ledger $410_3$.

As illustrated above, the components of the multi-tenant server 304 manage data in the peer-to-peer blockchain network 308 on behalf of the tenant systems $302_1$-$302_3$. In particular, the cloud environment provided by the multi-tenant server 304 may be used for securing data in transaction objects 902 stored in peer ledgers 410 such that unauthorized users/tenants/peers cannot view sensitive data.

In some implementations, the computing environments 400A and/or 400B may be built on top of a platform 412 comprised of services and/or metadata for implementing the other components of the multi-tenant server 304. In some implementations, the blockchain services 304D may include additional services, such as a coin service 402F for tracking records and items associated with each tenant/peer.

As used above, the term "user" is a generic term referring to an entity (e.g., an individual person) using a system and/or service. A multi-tenant architecture provides each tenant with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant includes a group of users who share a common access with specific privileges to a software instance providing a service. A tenant may be an organization (e.g., a company, department within a company, etc.). A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third party application developers providing applications/services and another set of tenants may be customers of different ones or all of the third-party application developers. A user may have one or more roles relative to a system and/or service. To provide some examples, a user may be a representative (sometimes referred to as an "end user") of a tenant (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS).

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or a tenant system) to communicate with the service. The server and client electronic devices may be operated by users respectively in the roles of administrator (also known as an administrative user) and end user.

Figure 11A:
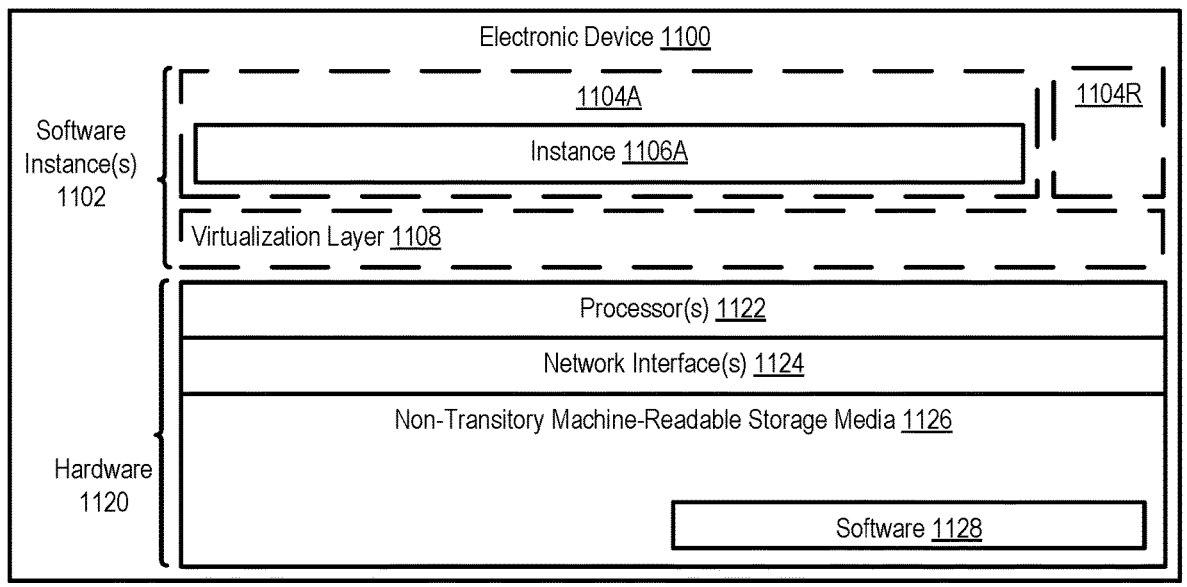
FIG. 11A shows an electronic device according to one example implementation.

FIG. 11A is a block diagram illustrating an electronic device 1100 according to some example implementations. FIG. 11A includes hardware 1120 comprising a set of one or more processor(s) 1122, a set of one or more network interfaces 1124 (wireless and/or wired), and non-transitory machine-readable storage media 1126 having stored therein software 1128 (which includes instructions executable by the set of one or more processor(s) 1122). Each of the previously described tenant systems 302 and the transaction queue 304A, the tenant level objects 304B, the network level objects 304C, and the blockchain services 304D may be implemented in one or more electronic devices 1100. In one implementation: 1) each of the tenant systems 302 is implemented in a separate one of the electronic devices 1100 (e.g., in user electronic devices operated by users where the software 1128 represents the software to implement tenant systems 302 to interface with the transaction queue 304A, the tenant level objects 304B, the network level objects 304C, and the blockchain services 304D (e.g., a web browser, a native client, a portal, a command-line interface, and/or an application program interface (API) based upon protocols such as Simple Object Access Protocol (SOAP), Representational State Transfer (REST), etc.)); 2) the transaction queue 304A, the tenant level objects 304B, the network level objects 304C, and the blockchain services 304D are implemented in a separate set of one or more of the electronic devices 1100 (e.g., a set of one or more server electronic devices where the software 1128 represents the software to implement the transaction queue 304A, the tenant level objects 304B, the network level objects 304C, and the blockchain services 304D); and 3) in operation, the electronic devices implementing the tenant systems 302 and the transaction queue 304A, the tenant level objects 304B, the network level objects 304C, and the blockchain services 304D would be communicatively coupled (e.g., by a network) and would establish between them (or through one or more other layers) connections for submitting a proposed new record or a proposed modification to an existing record in a physical object to the multi-tenant server 304. Other configurations of electronic devices may be used in other implementations (e.g., an implementation in which the tenant systems 302 and the multi-tenant server 304 are implemented on a single electronic device 1100).

In electronic devices that use compute virtualization, the set of one or more processor(s) 1122 typically execute software to instantiate a virtualization layer 1108 and software container(s) 1104A-R (e.g., with operating system-level virtualization, the virtualization layer 1108 represents the kernel of an operating system (or a shim executing on a base operating system) that allows for the creation of multiple software containers 1104A-R (representing separate user space instances and also called virtualization engines, virtual private servers, or jails) that may each be used to execute a set of one or more applications; with full virtualization, the virtualization layer 1108 represents a hypervisor (sometimes referred to as a virtual machine monitor (VMM)) or a hypervisor executing on top of a host operating system, and the software containers 1104A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 1128 (illustrated as instance 1106A) is executed within the software container 1104A on the virtualization layer 1108. In electronic devices where compute virtualization is not used, the instance 1106A on top of a host operating system is executed on the "bare metal" electronic device 1100. The instantiation of the instance 1106A, as well as the virtualization layer 1108 and software containers 1104A-R if implemented, are collectively referred to as software instance(s) 1102.

Alternative implementations of an electronic device may have numerous variations from that described above. For example, customized hardware and/or accelerators might also be used in an electronic device.

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 11B:
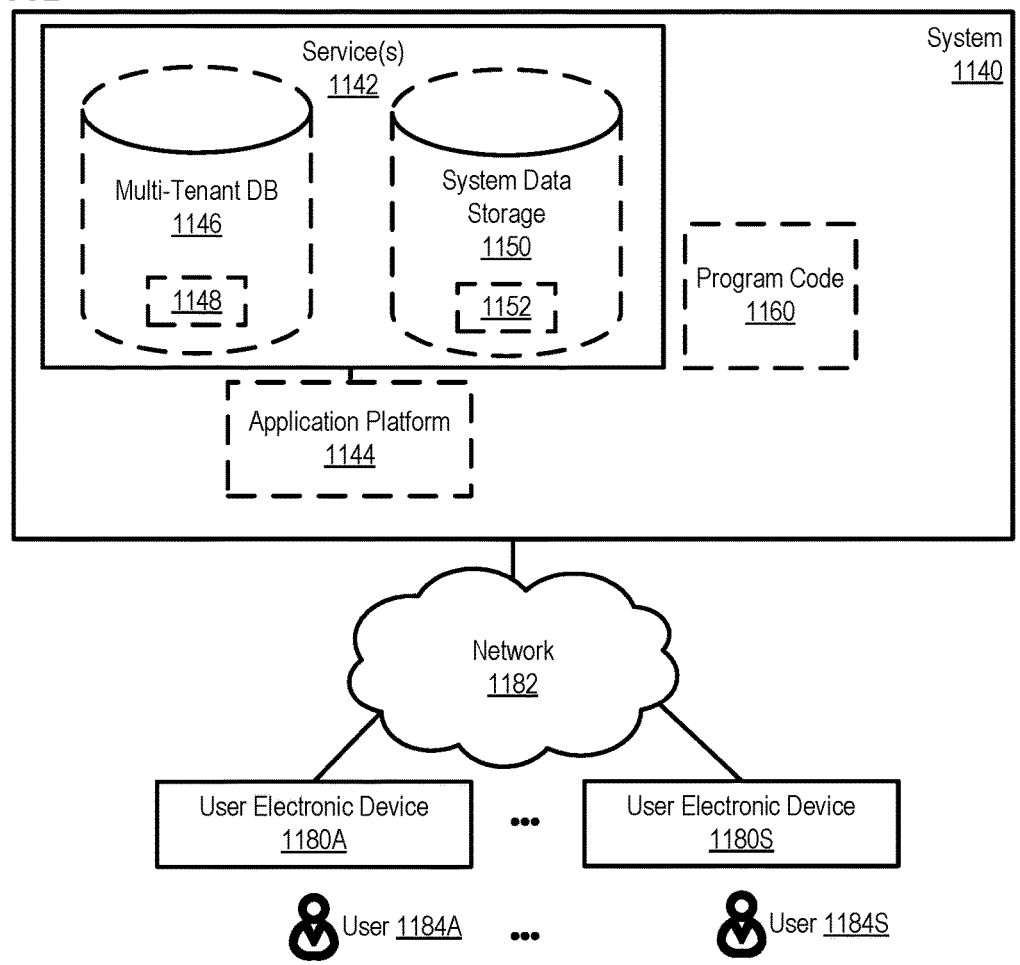
FIG. 11B shows a block diagram of an environment where the computing environment and the server may be implemented according to one example implementation.

FIG. 11B is a block diagram of an environment where the tenant systems 302₁-302₃ and the multi-tenant server 304 may be deployed, according to some implementations. A system 1140 includes hardware (a set of one or more electronic devices) and software to provide service(s) 1142, including the transaction queue 304A, the tenant level objects 304B, the network level objects 304C, and the blockchain services 304D. The system 1140 is coupled to user electronic devices 1180A-S over a network 1182. The service(s) 1142 may be on-demand services that are made available to one or more of the users 1184A-S working for one or more other organizations (sometimes referred to as outside users) so that those organizations do not need to necessarily be concerned with building and/or maintaining a system, but instead makes use of the service(s) 1142 when needed (e.g., on the demand of the users 1184A-S). The service(s) 1142 may communication with each other and/or with one or more of the user electronic devices 1180A-S via one or more Application Programming Interface(s) (APIs) (e.g., a Representational State Transfer (REST) API). The user electronic devices 1180A-S are operated by users 1184A-S.

In one implementation, the system 1140 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 1140 may include an application platform 1144 that enables PAAS for creating, managing, and executing one or more applications developed by the provider of the application platform 1144, users accessing the system 1140 via one or more of user electronic devices 1180A-S, or third-party application developers accessing the system 1140 via one or more of user electronic devices 3080A-S.

In some implementations, one or more of the service(s) 1142 may utilize one or more multi-tenant databases 1146 for tenant data 1148, as well as system data storage 1150 for system data 1052 accessible to system 1140. In certain implementations, the system 1140 includes a set of one or more servers that are running on server electronic devices and that are configured to handle requests for any authorized user associated with any tenant (there is no server affinity for a user and/or tenant to a specific server). The user electronic devices 1180A-S communicate with the server(s) of system 1140 to request and update tenant-level data and system-level data hosted by system 1140, and in response the system 1140 (e.g., one or more servers in system 1140) automatically may generate one or more Structured Query Language (SQL) statements (e.g., one or more SQL queries) that are designed to access the desired information from the one or more multi-tenant database 1146 and/or system data storage 1050.

In some implementations, the service(s) 1142 are implemented using virtual applications dynamically created at run time responsive to queries from the user electronic devices 1180A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1160 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1144 includes an application setup mechanism that supports application developers' creation and management of applications, which may be saved as metadata by save routines. Invocations to such applications, including the transaction queue 304A, the tenant level objects 304B, the network level objects 304C, and the blockchain services 304D, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 1182 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 1140 and the user electronic devices 1180A-S.

Each user electronic device 1180A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 1140. For example, the user interface device can be used to access data and applications hosted by system 1140, and to perform searches on stored data, and otherwise allow a user 1184 to interact with various GUI pages that may be presented to a user 1184. User electronic devices 1180A-S might communicate with system 1140 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 1180A-S might include an HTTP client, commonly referred to as a "browser," for sending and receiving HTTP messages to and from server(s) of system 1140, thus allowing users 1184 of the user electronic device 1180A-S to access, process and view information, pages and applications available to it from system 1140 over network 1182.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are be described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method to enable interoperability between blockchain networks, the method comprising:
   receiving, by a mapper implemented using one or more nodes of an interoperability network, a transaction emitted by a first blockchain network, wherein the interoperability network is a blockchain network that incorporates data blocks originating from each of a plurality of other blockchain networks serviced by the interoperability network;
   determining, by the mapper, a plurality of mappings for the received transaction based on a transaction type of the received transaction;
   selecting, by the mapper, a second blockchain network from the plurality of other blockchain networks to resolve consensus for the received transaction by matching a field of the received transaction to data in at least one of the data blocks incorporated into the interoperability network that originated from the second blockchain network thereby identifying the second blockchain network;
   transforming the received transaction to a transaction compatible with the second blockchain network according to a mapping determined for the received transaction, where the mapping correlates metadata of the received transaction with a format of a transaction of the second blockchain network;
   forwarding the transformed transaction to the second blockchain network to be processed by the second blockchain network;
   receiving a consensus response from the second blockchain network for the forwarded transaction;
   determining consensus for the received transaction within the interoperability network based on the consensus response of the second blockchain network and consensus criteria of the interoperability network;
   validating and committing a successful transaction of the second blockchain network to the interoperability network, in response to reaching consensus in the interoperability network based at least in part on the consensus response of the second blockchain network;
   sending an indication of the consensus determined within the interoperability network to the first blockchain network;
   receiving a consensus response from the first blockchain network based on the consensus determined within the interoperability network; and
   validating and committing the received transaction for the first blockchain network to the interoperability network, in response to successfully reaching consensus in the interoperability network based at least in part on the consensus response of the first blockchain network.

2. The method of claim 1, further comprising:
   transforming the received transaction to a transaction compatible with a third blockchain network.

3. The method of claim 2, further comprising:
receiving a consensus response from the third blockchain network for the transaction compatible with the third blockchain network.

4. The method of claim 1, further comprising:
rejecting the transaction where the consensus criteria of the interoperability network is not met.

5. A non-transitory machine-readable storage medium, including instructions that when executed by a processor, cause the processor to:
receive, by a mapper implemented using one or more nodes of an interoperability network, a transaction emitted by a first blockchain network, wherein the interoperability network is a blockchain network that incorporates data blocks originating from each of a plurality of other blockchain networks serviced by the interoperability network;
determine, by the mapper, a plurality of mappings for the received transaction based on a transaction type of the received transaction;
select, by the mapper, a second blockchain network from the plurality of other blockchain networks to resolve consensus for the received transaction by matching a field of the received transaction to data in at least one of the data blocks incorporated into the interoperability network that originated from the second blockchain network thereby identifying the second blockchain network;
transform the received transaction to a transaction compatible with the second blockchain network according to a mapping determined for the received transaction, where the mapping correlates metadata of the received transaction with a format of a transaction of the second blockchain network;
forward the transformed transaction to the second blockchain network to be processed by the second blockchain network;
receive a consensus response from the second blockchain network for the forwarded transaction;
determine consensus for the received transaction within the interoperability network based on the consensus response of the second blockchain network and consensus criteria of the interoperability network;
validate and commit a successful transaction of the second blockchain network to the interoperability network, in response to reaching consensus in the interoperability network based at least in part on the consensus response of the second blockchain network;
send an indication of consensus determined within the interoperability network to the first blockchain network;
receive a consensus response from the first blockchain network based on the consensus determined within the interoperability network; and
validate and commit the received transaction for the first blockchain network to the interoperability network, in response to successfully reaching consensus in the interoperability network based at least in part on the consensus response of the first blockchain network.

6. The non-transitory machine-readable storage medium of claim 5, wherein the instructions further cause the processor to:
transform the received transaction to a transaction compatible with a third blockchain network.

7. The non-transitory machine-readable storage medium of claim 6, wherein the instructions further cause the processor to:
receive a consensus response from the third blockchain network for the transaction compatible with the third blockchain network.

8. The non-transitory machine-readable storage medium of claim 5, wherein the instructions further cause the processor to:
reject the transaction where the consensus criteria of the interoperability network is not met.

9. A computing device to manage data in a peer-to-peer blockchain network, the computing device comprising:
a processor; and
a memory storing instructions that when executed by the processor cause the processor to:
receive, by a mapper implemented using one or more nodes of an interoperability network, a transaction emitted by a first blockchain network, wherein the interoperability network is a blockchain network that incorporates data blocks originating from each of a plurality of other blockchain networks serviced by the interoperability network;
determine, by the mapper, a plurality of mappings for the received transaction based on a transaction type of the received transaction;
select, by the mapper, a second blockchain network from the plurality of other blockchain networks to resolve consensus for the received transaction by matching a field of the received transaction to data in at least one of the data blocks incorporated into the interoperability network that originated from the second blockchain network thereby identifying the second blockchain network;
transform the received transaction to a transaction compatible with the second blockchain network according to a mapping determined for the received transaction, where the mapping correlates metadata of the received transaction with a format of a transaction of the second blockchain network;
forward the transformed transaction to the second blockchain network to be processed by the second blockchain network;
receive a consensus response from the second blockchain network for the forwarded transaction;
determine consensus for the received transaction within the interoperability network based on the consensus response of the second blockchain network and consensus criteria of the interoperability network;
validate and commit a successful transaction of the second blockchain network to the interoperability network, in response to reaching consensus in the interoperability network based at least in part on the consensus response of the second blockchain network;
send an indication of consensus determined within the interoperability network to the first blockchain network;
receive a consensus response from the first blockchain network based on the consensus determined within the interoperability network; and
validate and commit the received transaction for the first blockchain network to the interoperability network, in response to successfully reaching consensus in the interoperability network based at least in part on the consensus response of the first blockchain network.

10. The computing device of claim 9, wherein the instructions further cause the processor to:
 transform the received transaction to a transaction compatible with a third blockchain network.

11. The computing device of claim 10, wherein the instructions further cause the processor to:
 receive a consensus response from the third blockchain network for the transaction compatible with the third blockchain network.

12. The computing device of claim 9, wherein the instructions further cause the processor to:
 reject the transaction where the consensus criteria of the interoperability network is not met.

* * * * *